(12) United States Patent
Spalding et al.

(10) Patent No.: US 11,718,051 B2
(45) Date of Patent: Aug. 8, 2023

(54) PRINT ON DEMAND HEAT BLANKET SYSTEM

(71) Applicant: The Boeing Company, Houston, TX (US)

(72) Inventors: John F. Spalding, Seattle, WA (US); Jeffrey Lynn Duce, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/963,957

(22) Filed: Oct. 11, 2022

(65) Prior Publication Data

US 2023/0035062 A1    Feb. 2, 2023

Related U.S. Application Data

(62) Division of application No. 16/860,243, filed on Apr. 28, 2020, now Pat. No. 11,498,296.

(51) Int. Cl.
| | |
|---|---|
| *B29C 35/00* | (2006.01) |
| *B29C 73/00* | (2006.01) |
| *B29C 73/34* | (2006.01) |
| *B29C 35/02* | (2006.01) |
| *B29C 73/10* | (2006.01) |
| *B29L 31/30* | (2006.01) |

(52) U.S. Cl.
CPC .............. *B29C 73/34* (2013.01); *B29C 35/02* (2013.01); *B29C 73/10* (2013.01); *B29L 2031/3082* (2013.01); *B29L 2031/3085* (2013.01)

(58) Field of Classification Search
CPC ......... B29C 35/00; B29C 35/02; B29C 73/00; B29C 73/10; B29C 73/30; B29C 73/34
See application file for complete search history.

(56) References Cited

U.S. PATENT DOCUMENTS

| | | |
|---|---|---|
| 7,857,484 B2 | 12/2010 | Marshall |
| 8,977,528 B2 | 3/2015 | Greenberg |

(Continued)

FOREIGN PATENT DOCUMENTS

EP    2894451 A1    7/2015

OTHER PUBLICATIONS

Extended European Search Report in corresponding European Patent Application No. 21168824.7 dated Oct. 18, 2021 (9 pages).

*Primary Examiner* — Jacob T Minskey
*Assistant Examiner* — Matthew Hoover
(74) *Attorney, Agent, or Firm* — Ferguson Braswell Fraser Kubasta PC

(57) ABSTRACT

A heat blanket system including a blanket including a first sub-area and a second sub-area. The heat blanket system also includes heating elements printed on the blanket. First spacings between first ones of the heating elements in the first sub-area varies relative to second spacings between second ones of the heating elements in the second sub-area. The first spacings and the second spacings vary according to a design. The design is configured for use on a uniquely defined rework area on a uniquely defined composite material object including a third area including a heat sink region and a fourth area including a non-heat sink region. The first sub-area is sized and dimensioned to be placed over the third area. The second sub-area is sized and dimensioned to be placed over the fourth area.

20 Claims, 11 Drawing Sheets

(56) References Cited

U.S. PATENT DOCUMENTS

| | | | |
|---|---|---|---|
| 9,214,018 B1 | 12/2015 | Engelbart | |
| 9,403,328 B1 | 8/2016 | Hafenrichter et al. | |
| 9,736,888 B2 * | 8/2017 | Duce | F24D 13/022 |
| 10,064,303 B2 | 8/2018 | Dalal | |
| 10,118,547 B2 | 11/2018 | Duce | |
| 10,356,847 B2 * | 7/2019 | Duce | H05B 3/20 |
| 2018/0235031 A1 * | 8/2018 | Zhu | H05B 3/34 |

\* cited by examiner

PRINT ON DEMAND HEAT BLANKET SYSTEM

RELATED APPLICATIONS

This application is a divisional application of U.S. application Ser. No. 16/860,243, filed Apr. 28, 2020, the entirety of which is hereby incorporated by reference.

FIELD

The one or more embodiments are in the field of composite material reworking and more particularly in the field of heating blankets used for reworking composite materials.

BACKGROUND

Inconsistencies may sometimes form in composite material objects. An "inconsistency" is defined as any measurable feature of a composite material which lies outside a pre-determined normative engineering tolerance.

The composite material may be reworked in order to remove or mitigate the inconsistency. "Reworking" a composite material is defined as any procedure performed on the composite material to remove or mitigate the inconsistency. The term "mitigate the inconsistency" is defined as bringing the composite material object into pre-determined engineering tolerances.

Reworking a composite material may involve adding a liquid composite resin, a pre-preg tape (a "pre-preg" is pre-impregnated composite fibers where a thermoset polymer matrix material, such as epoxy, or a thermoplastic resin is already present), a composite patch, or some other pre-cured composite material to the area of the inconsistency. The pre-cured material is then bonded to the parent structure, mitigating the inconsistency using a film or paste adhesive. The pre-cured composite material and adhesive are heated as part of a curing process.

In some cases, heating may be accomplished using a heating blanket. However, when the pre-cured composite material has varying thickness, or is disposed over components in the object that act as heat sinks, then non-uniform heating may occur within the pre-cured composite material. The non-uniform heating may create inconsistencies during the cure process.

SUMMARY

The one or more embodiments includes a heat blanket system. The heat blanket system includes a blanket including a first sub-area and a second sub-area. The heat blanket system also includes heating elements printed on the blanket. First spacings between first ones of the heating elements in the first sub-area varies relative to second spacings between second ones of the heating elements in the second sub-area. The first spacings and the second spacings vary according to a design. The design is configured for use on a uniquely defined rework area on a uniquely defined composite material object including a third area including a heat sink region and a fourth area including a non-heat sink region. The first sub-area is sized and dimensioned to be placed over the third area. The second sub-area is sized and dimensioned to be placed over the fourth area.

Other aspects of the invention will be apparent from the following description and the appended claims.

DETAILED DESCRIPTION

Figure 1:
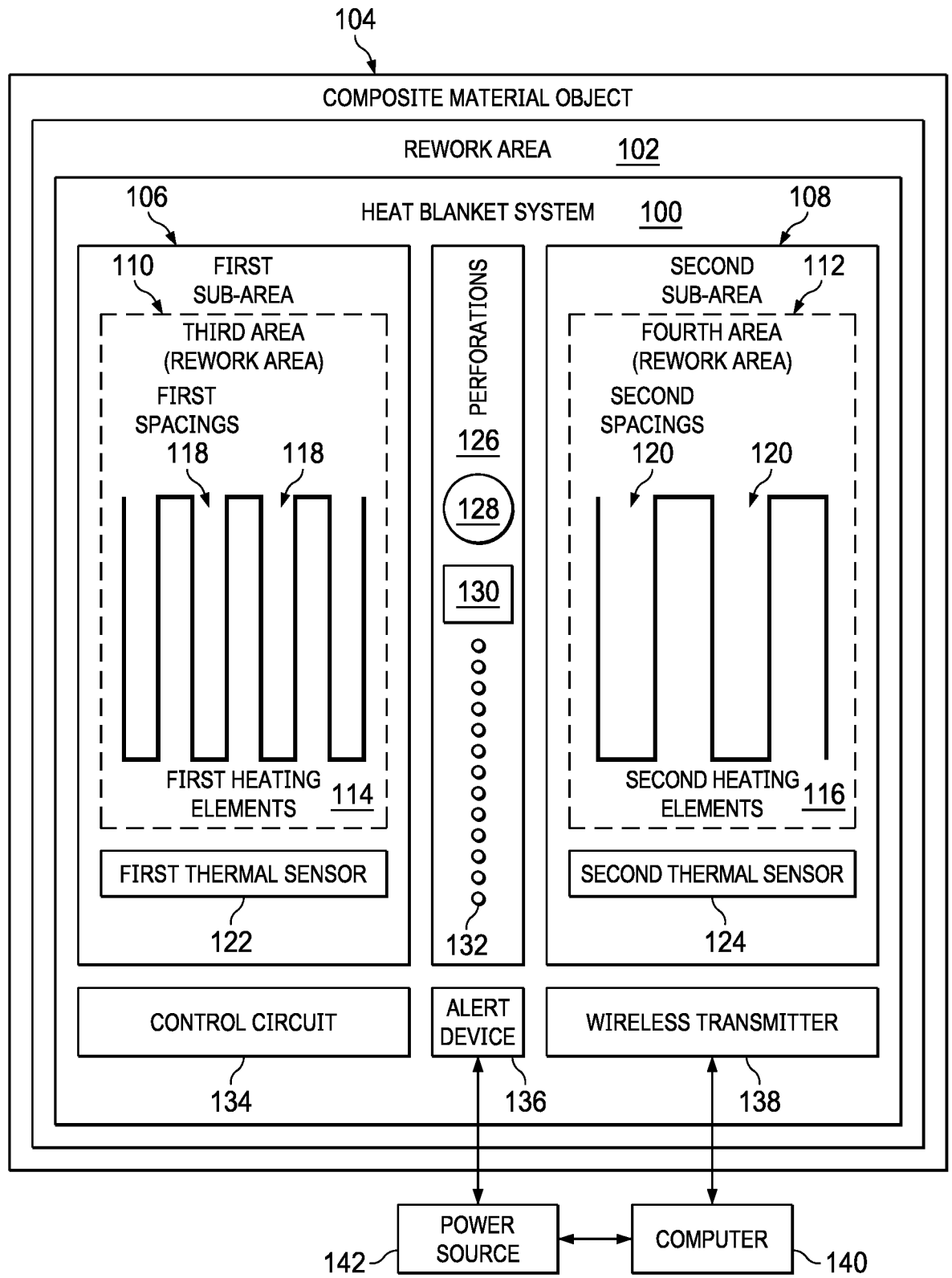
FIG. 1 illustrates a heat blanket system disposed on a rework area, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In an example of a temperature differential, "about a uniform temperature" refers to a range of temperatures about an ideal temperature for a particular application. Thus, in a more particular, but non-limiting, example, an "about uniform temperature" could be 200 degrees Fahrenheit plus or minus ten degrees Fahrenheit throughout a composite material, assuming that a temperature variance of ten degrees Fahrenheit in different areas of the composite material was within the pre-determined engineering tolerance. In any case, the ordinary artisan is capable of assessing what is an acceptable engineering tolerance for a particular product, and thus is capable of assessing how to determine the variance of measurement contemplated by the term "about."

In general, embodiments of the invention relate to print-on-demand heat blanket systems specifically designed to be used with respect to curing a particular uncured composite patch, or other uncured composite material, applied to a specific area of rework on a specific object made of a composite material. In other words, the one or more embodiments provide for a heat blanket system, and method for manufacturing and use, specifically tailored for reworking a specific inconsistency on a specific composite material object.

As used herein, a "heat blanket system" is defined as a blanket, a designated pattern of heating elements disposed on or in the blanket, and any other components attached to the blanket (such as, but not limited to, leads, circuitry, power sources, transformers, etc.). The "heat blanket system" of the one or more embodiments provides for a "heat blanket system" that has a custom array (i.e., specifically designed for a particular rework project) of heating elements, plus any components attached to the blanket.

Heating blankets, such as but not limited to electric blankets, are used for heating and curing composite patches and other composite material. Heating blankets may be procured from vendors in a variety of sizes and are typically round or rectangular in shape.

Procuring a pre-made, off-the-shelf heating blanket can result in challenges when reworking an area of a composite object, such as a portion of an aircraft. One challenge is that the sizes and shapes of inconsistencies vary widely. A technician may attempt to anticipate what size blanket will be useful for reworking a variety of inconsistencies. However, the technician may significantly modify the rework approach based on the size and shape of the available blankets. If the available blankets cannot be adapted to the application, then a new blanket must be ordered. The typical lead time for a custom heat blanket can be a month or more.

In the case of an aircraft to be reworked, the delay may result in loss of service time for the aircraft, which in turn directly translates into lost revenue and profit for the aircraft operator.

Another challenge of using an off-the-shelf heating blanket is that such heating blankets have heating elements disposed at a uniform spacing throughout the heating blanket. Thus, the off-the-shelf heating blanket produces a uniform heat output, or watt density, for the area of the blanket. As a result, when the blanket is energized, the blanket emits the same amount of heat over the surface of the blanket. A challenge associated with uniform heating is that many reworking projects for aircraft will not have uniform thermal requirements. For example, skin thicknesses can change over multiple sections of an aircraft in which an inconsistency is located. Furthermore, the inconsistency may be located over integral stiffeners or a honeycomb core which underly certain portions of the aircraft skin in which the inconsistency is located. As a result, when an off-the shelf heating blanket emits a uniform amount of heat over the rework region, temperatures will undesirably vary widely across the rework area being cured (e.g., cooler under the stiffeners and warmer where the skin is thinner). However, most rework processes specify that the curing temperature remain within a pre-determined threshold throughout the composite patch. For example, the temperature difference throughout a composite patch might be specified to remain within ten degrees Fahrenheit above or below the cure temperature. In other words, what is desirable is not that the blanket emits a uniform amount of heat, but rather that the composite patch maintain an even elevated temperature throughout the composite patch, regardless of thickness differences in the patch, and regardless of the presence of heat sinks in the underlying structure.

To mitigate the non-uniform patch temperatures, localized insulation may be placed on a vacuum bag to warm areas within the patch that are below the pre-defined temperature threshold. A challenge with using localized insulation is that the insulation and cure are constantly monitored and managed for the duration of the curing process. Insulation is added or removed throughout curing to prevent thermocouples from becoming too hot or cold. Thus, the monitoring process is burdensome, and error prone. Errors may result in having to redo a rework project. Redoing a rework project is undesirable both in terms of expense and the time taken to perform the additional rework project. In some cases, the part being reworked may be discarded when an error arises, further increasing cost and rework time.

The one or more embodiments address these and other challenges by providing for a print-on-demand (POD) heat blanket system that is specifically tailored to a specific rework project. The POD heat blanket system emits non-uniform heating across the dimensions of the POD heat blanket system in order to compensate for composite patch areas that require more or less heat to maintain the temperature difference threshold within the composite patch. Areas of the rework that require additional heating, due to increased patch thickness or the presence of heat sinks in the underlying composite part, receive additional heating through greater heating element density. In turn, areas of the rework that require less heating, due to decreased patch thickness or the absence of heat sinks in the underlying composite part, will receive less heating through lower heating element density.

The term "heating element density" is defined as a measurement of the spacing, or distance, between heating elements. Thus for example, a first blanket with a higher heating element density relative to a second blanket will have more heating elements per inch than the second blanket.

The POD heat blanket system of the one or more embodiments has several benefits. The POD heat blanket system achieves improved curing results by maintaining a more uniform heating temperature throughout the rework area, i.e., by avoiding undesirable temperature variations in the rework area. The POD heat blanket system may be manufactured at the workshop performing the rework project, thereby increasing the speed of the rework process and decreasing the time an aircraft is out of service. The POD heat blanket system reduces costs by allowing a technician to manufacturing or procure the specific heat blanket system to be used for a particular rework project, instead of procuring many off-the-shelf heating blankets of varying shapes and sizes for selective use in different rework projects.

Attention is now turned to the figures. FIG. 1 illustrates a heat blanket system disposed on a rework area, in accordance with one or more embodiments. The heat blanket system (100) may be laid on, cover, or otherwise be disposed on the rework area (102) of a composite material object (104). The rework area (102) is a portion of the composite material object (104) that is to be reworked. The rework area (102) may be larger or smaller than the inconsistency (not shown) present in or on the composite material object (104). In many cases, the rework area (102) is larger than the inconsistency.

The heat blanket system (100) is divided into multiple sub-areas, including a first sub-area (106) and a second sub-area (108). Each sub-area is a portion of heat blanket system (100). Each sub-area may be part of one contiguous material that forms the heat blanket system (100), or may be discontinuous from some portion of the heat blanket system (100).

The heat blanket system (100) itself is a substrate which may be formed from a variety of materials, such as paper, polyethylene terephthalate (PET), or poly (4,4'-oxydiphenylene-pyromellitimide) (which is marketed by the DuPont Company under the trademark KAPTON®), or other polymer films. Additional materials are added to the substrate, such as one or more of heating elements, thermal sensors, thermocouples, etc., as described further below. Additional layers also may be added to the substrate. For example, either side of the substrate may be laminated with one or more dielectric layers or films to provide electrical insulation for any electrical elements disposed on the substrate. Thus, a first side of the substrate may have a first dielectric or insulative layer, and a second side of the substrate may have a second dielectric or insulative layer disposed opposite the first side of the substrate. Optionally, the side of the heat blanket placed against the inconsistency may be a one-side bondable film. This option allows the blanket to be placed directly on the rework surface without an additional layer of release film that would normally be present.

Each sub-area of the heat blanket system (100) is designed to be placed on a specific area of the composite material object (104) in the rework area (102). Thus, for example, the first sub-area (106) of the heat blanket system (100) overlies a third area (110) of the rework area (102). Similarly, for example, the second sub-area (108) of the heat blanket system (100) overlies a fourth area (112) of the rework area (102).

Heating elements may be placed on the heat blanket system (100) by a variety of methods, such as by deposition or by printing. Printing methods include, but are not limited to, three dimensional printing, inkjet printing, screen printing, atomized jetted deposition, plasma flame spray, etc. The heating elements may be electrically resistive heating elements, such as electrically conductive or resistive inks, or may be some other type of heating element, such as fluid tubes.

Each sub-area of the heat blanket system (100) may have a different set of heating elements. For example, the third area (110) of the heat blanket system (100) may have disposed thereon first heating elements (114). Similarly, the fourth area (112) of the heat blanket system (100) may have disposed thereon second heating elements (116).

Each set of heating elements may have different spacings between individual heating elements. Thus, for example, the first heating elements (114) may have first spacings (118). Similarly, the second heating elements (116) may have second spacings (120). As used herein, "spacing" refers to the distance between individual heating elements. In this example, the first spacings (118) is less than the second spacings (120). As a result, the density of the first heating elements (114) is greater than the density of the second heating elements (116).

Accordingly, the total heat produced by the first heating elements (114) in the first sub-area (106) over the third area (110) is greater than the total heat produced by the second heating elements (116) in the second sub-area (108) over the fourth area (112). However, due to the differential heating needs in the third area (110) relative to the fourth area (112), the temperature variation within the rework area (102) as a whole will remain within the threshold temperature range. In the arrangement shown in FIG. 1, the third area (110) of the rework area (102) is a heat sink, and the second sub-area (108) of the rework area (102) is a non-heat sink region.

The spacings of the heating elements are part of a design that is selected based on a heat model generated for the rework area (102) of the composite material object (104). The heat model is a map which indicates how much heat is to be applied over any given section of the rework area (102) in order to maintain the rework area (102) within a threshold temperature difference. Thus, in this example, more heat is to be applied in the third area (110) relative to the fourth area (112) in order to maintain the desired threshold temperature differential throughout the rework area (102) during curing of a composite patch (see FIG. 7).

Figure 13:
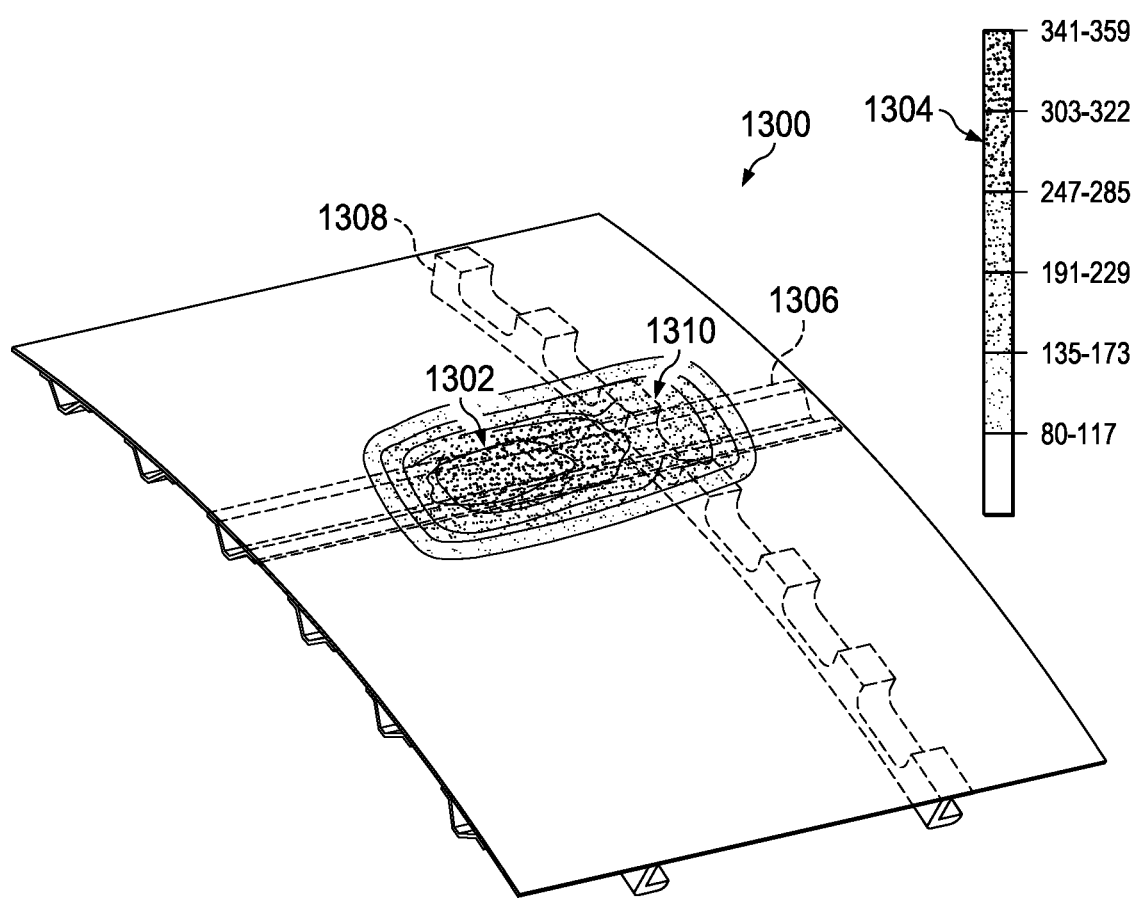
FIG. 13 illustrates a heating model for the panel shown in FIG. 8, in accordance with one or more embodiments.

An example of the heat model is shown with respect to FIG. 13. The heat model (1300) may be used to generate a design for the heat blanket system (100) which will be used to manufacture the heat blanket system (100) shown in FIG. 1. Specifically, the design specifies the first spacings (118) for the third area (110) and the second spacings (120) for the second sub-area (108). The design also may specify the type of heating elements used, and the shape of the heating elements used. The design may also specify the shape of the various areas and/or the heating elements of the heat blanket system (100). Thus, while FIG. 1 shows rectangular, evenly spaced heating elements and areas, the shapes and sizes of the third area (110), the fourth area (112), the first heating elements (114), and the second heating elements (116) may vary in accordance with the heating predicted by the heat model (1300) to be used for various uniquely-defined sub-areas of the rework area (102).

Thus, the one or more embodiments provide for a heat blanket system (100) having a first sub-area (106) and a second sub-area (108). The heating elements are printed on the heat blanket system (100). First spacings (118) between first ones of the heating elements (first heating elements (114)) in the first sub-area (106) varies relative to second spacings (120) between second ones of the heating elements (second heating elements (116)) in the second sub-area (108). The first spacings (118) and the second spacings (120) vary according to a design. The design is configured for use on a uniquely defined rework area on a uniquely defined composite material object (104) having a third area (110) including a heat sink region and a fourth area (112) including a non-heat sink region. In other embodiments, the arrangement may be reversed or varied. The first sub-area (106) is sized and dimensioned to be placed over the third area (110). The second sub-area (108) is sized and dimensioned to be placed over the fourth area (112). The first spacings (118) may be less than the second spacings (120), or vice versa.

The heat blanket system (100) may be provided with additional features. For example, the heat blanket system (100) may include one or more thermal sensors, such as first thermal sensor (122) and second thermal sensor (124). Each thermal sensor may be a thermistor, thermometer, or any other heat sensor suitable for printing or deposition on the heat blanket system (100).

Each thermal sensor senses heat in a particular region of the rework area (102). Thus, for example, the first thermal sensor (122) may sense a first temperature in the third area (110) of the rework area (102). Similarly, the second thermal sensor (124) may sense a second temperature in the fourth area (112) of the rework area (102).

Still other features may be provided. For example, perforations (126) may be disposed through the heat blanket system (100) at various selected portions of the heat blanket system (100). The perforations (126) are provided, in one embodiment, in order to vent gases emitted by the curing composite material in the rework area (102). In some embodiments, the perforations could affect the heating applied to the various areas in the rework area (102). The heat model (1300) may take into account such heating variations, if significant, and the spacings of the heating elements in the various areas of the heat blanket system (100) may be modified accordingly.

The perforations (126) may be of a variety of shapes and sizes, and may be disposed at different densities (spacings) relative to each other in different areas of the heat blanket system (100). Thus, for example, first perforation (128) is shown as a circle, while second perforation (130) is shown as a square, while additional perforations (132) are shown as circles smaller than the first perforation (128). While the perforations (126) are shown outside of the first sub-area (106) and the second sub-area (108) of the heat blanket system (100), the perforations (126) may be disposed within the first sub-area (106) and/or the second sub-area (108), or other portions of the heat blanket system (100).

Additional features may be added to the heat blanket system (100). For example, a control circuit (134) may be printed or otherwise deposited on the heat blanket system (100). The control circuit (134) may be an application specific integrated circuit (ASIC) or other electrical circuit specifically designed for the heat blanket system (100) for use for the rework area (102). The control circuit (134) may be used to control or modify power delivered to the first heating elements (114) and/or the second heating elements (116) based on signals received by the wireless transmitter, such as signals received from a remote computer. The control circuit (134) may also be used to monitor the first thermal sensor (122) and the second thermal sensor (124), and/or to calculate a difference in temperature as measured by the first thermal sensor (122) and the second thermal sensor (124).

The control circuit (134) may also control other devices printed or otherwise disposed on the heat blanket system (100). For example, an alert device (136) may be printed or otherwise disposed on the heat blanket system (100). The control circuit (134) may be programmed to cause the alert device (136) to issue an alert when a difference in temperature measured by the first thermal sensor (122) and the second thermal sensor (124) exceeds a threshold. The alert may take the form of an audio alarm, a visual cue (such as a blinking light emitting diode (LED)), etc.

In another example, a wireless transmitter (138) may be printed or otherwise disposed on the heat blanket system (100). The wireless transmitter (138) may transmit temperature measurements generated by the first thermal sensor (122) and/or the second thermal sensor (124). The wireless transmitter (138) may also transmit an alert to a remote computer when the control circuit (134) determines that a difference in temperature between the first thermal sensor (122) and the second thermal sensor (124) exceeds the threshold.

The wireless transmitter (138) may also be in communication with a computer (140). The computer (140) may be programmed to monitor and/or control various features of the heat blanket system (100), including the power source (142) described below. For example, the computer (140) may record temperature measurements from the first thermal sensor (122) and/or the second thermal sensor (124). The computer (140) may take the place of some of the functions of the control circuit (134), such as to monitor a difference between the measurements of the first thermal sensor (122) and the second thermal sensor (124), or to generate an alert. The computer (140) may also be the same computer that generates the heat model (1300) and/or the design of the heating elements, as described respect to the example shown in FIG. 8 through FIG. 14B. In some embodiments, the computer (140) may be miniaturized and disposed directly on the heat blanket system (100), possibly in place of the control circuit (134).

As indicated above, the first heating elements (114) and the second heating elements (116) are powered, such as by a power source (142). The power source (142) may be an electrical power source, when the heating elements are resistive heating elements. The power source (142) may be a liquid heat source in the case that the heating elements are pipes or capillaries through which a heated fluid may flow. In some embodiments, the power source (142) connects to a junction (not shown) printed or otherwise disposed on the heat blanket system (100) and in communication with the heating elements. In other embodiments, the power source (142) may be printed or otherwise directly disposed on the heat blanket system (100). The power source (142) may be a single source of power, such as electricity or heated fluids, or may be multiple sources of power. In the case of a power source (142) based on electricity, the power source (142) may provide a constant current to both the first heating elements (114) and the second heating elements (116).

As an alternative embodiment, the first heating elements (114) and the second heating elements (116) may have the same spacings, or different spacings shown. In this case, such as when the power source (142) is an electrical power source, different currents may be applied to the first heating elements (114) and/or the second heating elements (116). As a result, differential heating may be accomplished by varying the power supplied to the heating elements, rather than varying the spacings between the heating elements.

As an alternative embodiment, heating elements may include additional features, such as including positive thermal coefficient self-regulation features. Some printable heating materials have the capability to self-regulate to a predetermined temperature. In this manner, computer control or feedback might not be used to maintain the desired temperature within the heat blanket system (100) and/or patch.

The heat blanket system (100) may be provided with yet additional features. Thus, while FIG. 1 shows a configuration of components, other configurations may be used without departing from the scope of the invention. For example, various components may be combined to create a single component. As another example, the functionality performed by a single component may be performed by two or more components. An additional, more specific exemplary variation is described with respect to FIG. 4 through FIG. 7.

Figure 2:
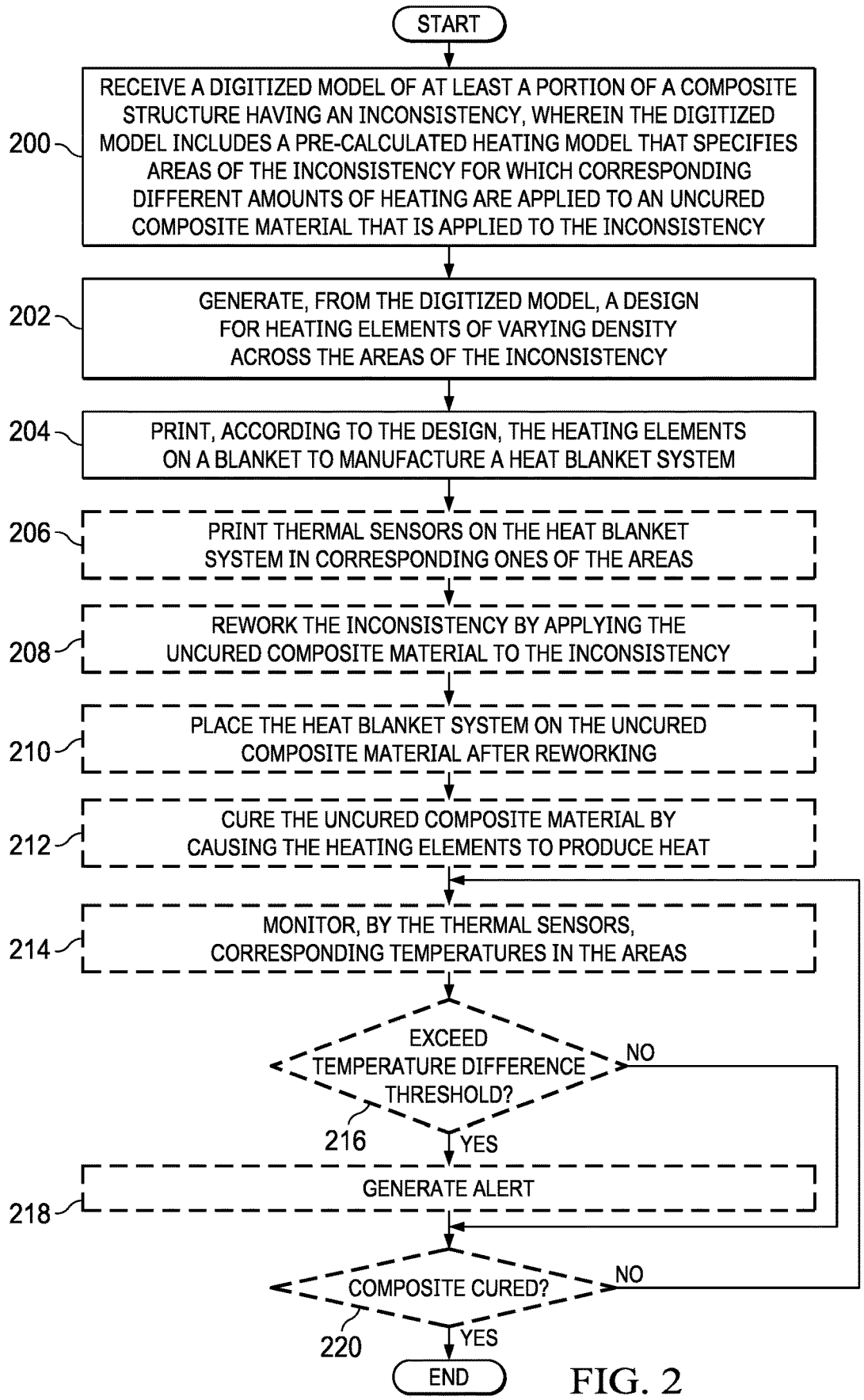
FIG. 2 illustrates a method for manufacturing and using a print-on-demand heat blanket system, in accordance with one or more embodiments.

FIG. 2 illustrates a method for manufacturing and using a print-on-demand heat blanket system, in accordance with one or more embodiments. The method shown in FIG. 2 may be implemented using the heat blanket system (100) shown in FIG. 1. Steps shown with dashed lines may be considered optional in some embodiments.

As described with respect to FIG. 2, a "manufacturing system" is recited as performing the various steps. The "manufacturing system" refers to the computer, printer, and other hardware used to manufacture the heat blanket system. Thus, the "manufacturing system" may include the computer (500) of FIG. 1 and the three dimensional printer (506) of FIG. 5. In each step, the appropriate feature of the manufacturing system performs the specified act. Thus, for example, while the description of FIG. 2 refers to the "manufacturing system" performing the step of receiving a digitized model, the actual step of receiving may be performed by the computer (500). In another example, "manufacturing system" performing the step of printing may refer to an action performed the three dimensional printer (506) shown in FIG. 5.

Figure 6:
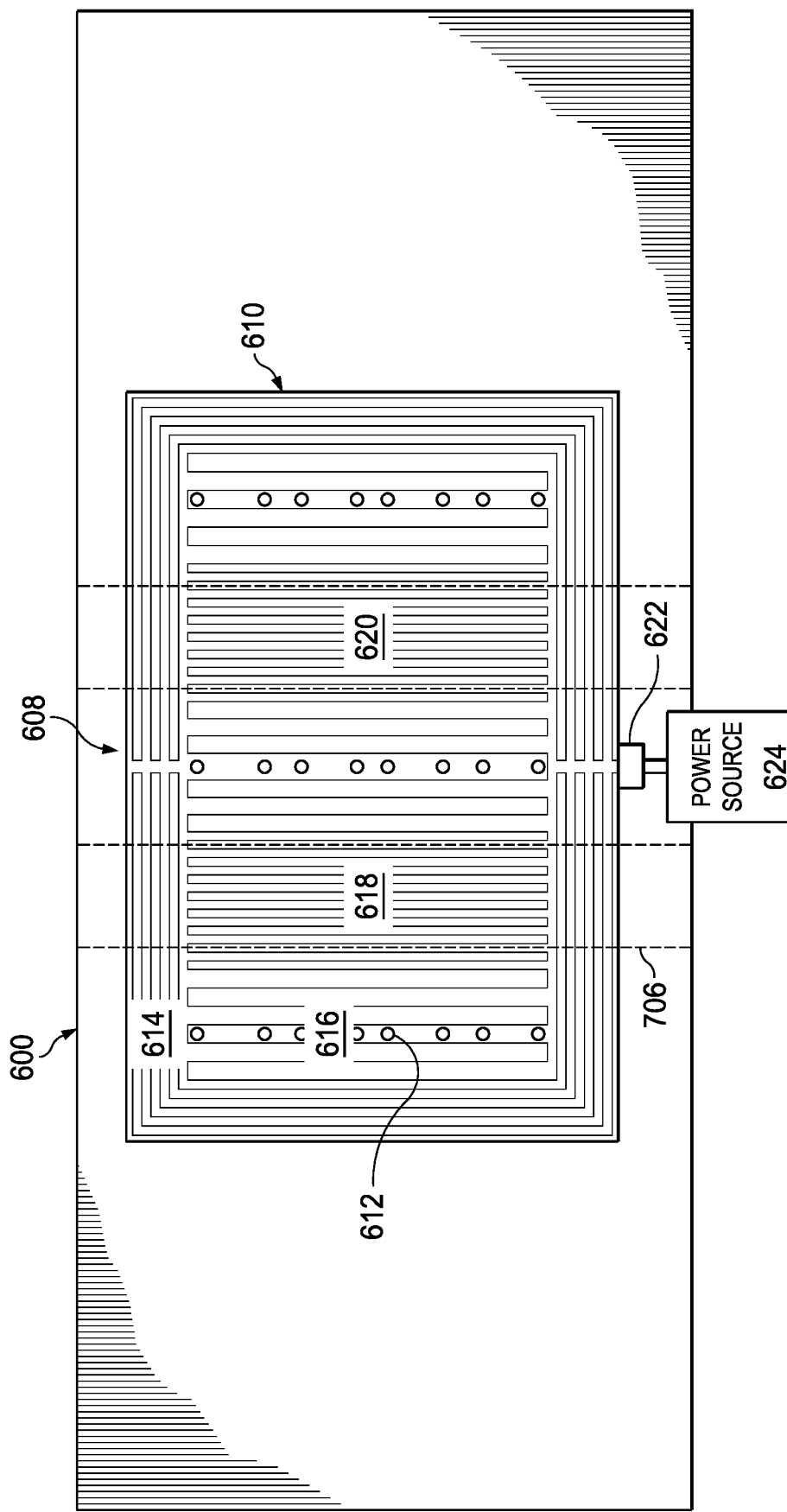
FIG. 6 illustrates a specific example of a print-on-demand heat blanket system, and a method of use, in accordance with one or more embodiments.

At step 200, the manufacturing system receives a digitized model of at least a portion of a composite structure having an inconsistency, wherein the digitized model includes a pre-calculated heating model that specifies areas of the inconsistency for which corresponding different amounts of heating are applied to an uncured composite material that is applied to the inconsistency. Thus, for example, a computer may receive the digitized model of the composite structure and accompanying pre-calculated heating model. An example of the heating model is shown with respect to FIG. 13 and an example of a design for a heat blanket system is shown in FIG. 6 and FIG. 14B. In some embodiments, the computer may also generate the digitized model.

At step 202, the manufacturing system generates, from the digitized model, a design heating elements of varying density across the areas. The design is configured to cause the heating elements to generate a first amount of heat in a first sub-area in the areas. The design is further configured to cause the heating elements to generate a second amount of heat in a second sub-area in the areas. The first amount of heat is different than the second amount of heat, in order to accommodate differential heating requirements in different sub-areas of the rework area.

At step 204, the manufacturing system prints, according to the design, the heating elements on a blanket to manufacture a heat blanket system. The term "blanket" (by itself) and "heat blanket system" are differentiated in that the "heat blanket system" is the "blanket," after the heating elements designed according to the one or more embodiments have been printed upon the blanket, along with any other components attached on or in the blanket.

Printing may be accomplished using a three dimensional printer loaded with electrically resistive inks or other printing substances. Printing may also be accomplished using deposition, screen printing, inkjet printing, atomized jetted deposition, plasma flame spray, paste deposition, and others. Other techniques may also be used to deposit or otherwise place the heating elements on the blanket.

The method of FIG. 2 may terminate thereafter. However, in other embodiments, the method of FIG. 2 may include more steps.

For example, at step 206, the manufacturing system may print thermal sensors on the heat blanket system in corresponding ones of the areas. Printing thermal sensors may be accomplished using a three dimensional printer. However, pre-manufactured thermal sensors may also be attached to the heat blanket system. Other devices may also be printed on the heat blanket system at this step (or some other step), such as but not limited to a control circuit, an alert device, a wireless transmitter, etc.

In another example, at step 208, the manufacturing system reworks the inconsistency by applying the uncured composite material to the inconsistency. The uncured composite material may be applied by a robot applying a composite patch, or liquid resin to the site of the inconsistency. Reworking may include removing some or all of the composite material at the site of the inconsistency. In some cases, a human may manually rework the inconsistency.

At step 210, the manufacturing system places the heat blanket system on the uncured composite material after reworking. A robot or a human technician may place the heat blanket system on the inconsistency such that the appropriate sub-areas of the heat blanket system are overlaid the corresponding modeled areas of the rework area.

At step 212, the manufacturing system cures the uncured composite material by causing the heating elements to produce heat. For example, a control circuit or computer may be used to apply electrical power to resistive heating elements. In this case, the method may also include connecting the resistive heating elements to an electrical power source, and applying electrical power to the resistive heating elements. In the case that the heating elements are tubes, a heated liquid may be pumped through the heating elements using a pump.

At step 214, the manufacturing system monitors, by the thermal sensors, corresponding temperatures in the areas. For example, a control circuit or a compute may monitor the temperature readings taken by the thermal sensors and then calculate a difference in the temperature readings.

At step 216, the manufacturing system then determines whether the temperature difference exceeds a threshold. The threshold may vary depending on the particular procedure, but in an example the temperature difference threshold may be 10 degrees Fahrenheit (i.e., the difference in any two measured temperatures across the rework area is less than or equal to 10 degrees Fahrenheit).

If the temperature difference threshold is exceeded (a "yes" determination at step 216), then at step 218 the system may generate an alert. In particular, the alert is generated when a first temperature in a first sub-area of the areas exceeds a second temperature in a second sub-area in the by more than the threshold temperature difference. The alert may be an audio, visual, or audiovisual alert that indicates to a technician that the heating differential has exceeded the threshold. Thus, the technician may take action to reduce the temperature differential across the rework area. Otherwise (a "no" determination at step 216), the process proceeds to step 220.

At step 220, a determination is made whether the composite structure has been cured. If not, (a "no" determination at step 220), then the process returns to step 214 for monitoring and repeats. If curing is complete (a "yes" determination at step 220), then the process terminates.

Figure 3:
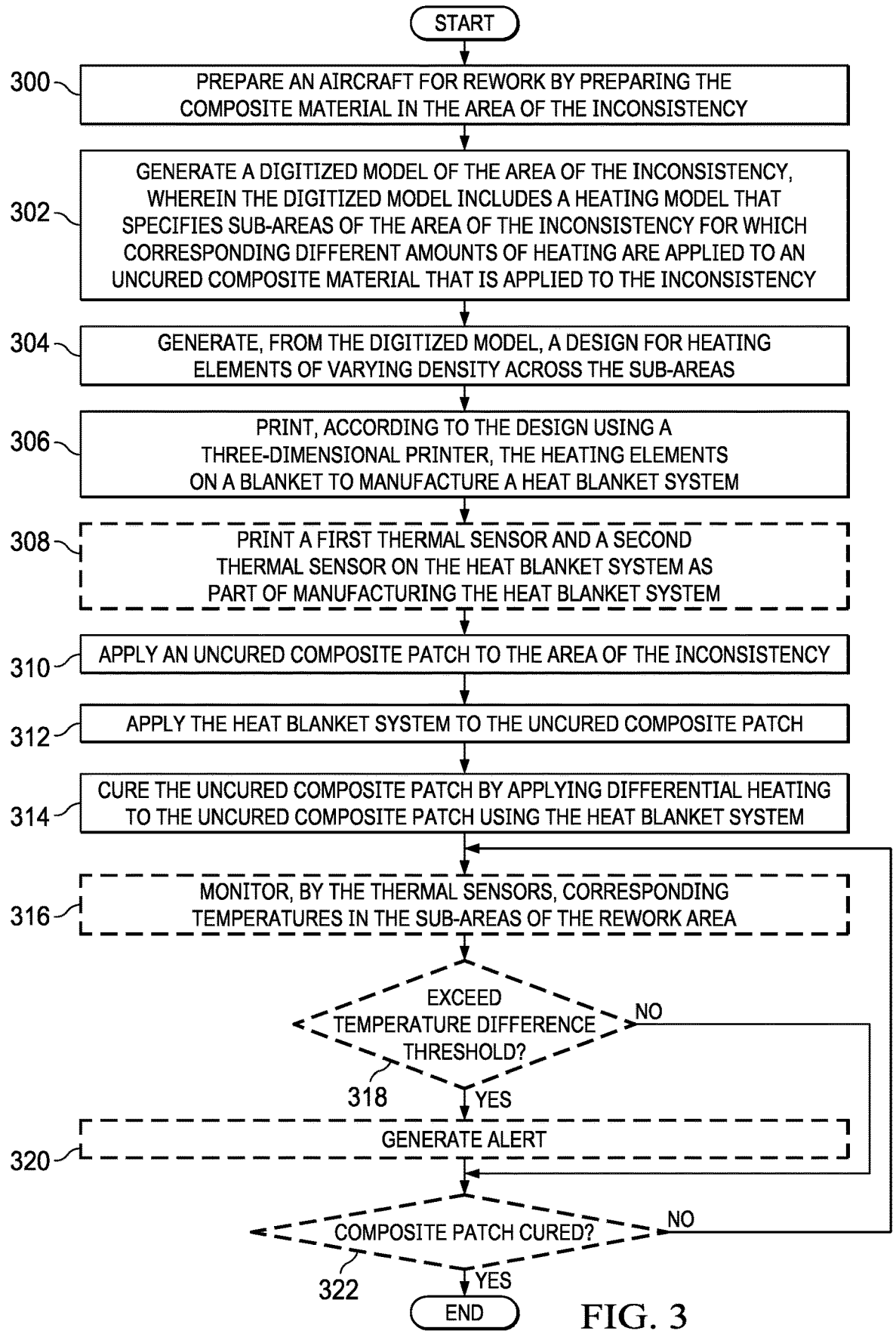
FIG. 3 illustrates a method for reworking an aircraft using a print-on-demand heat blanket system, in accordance with one or more embodiments.

FIG. 3 illustrates a method for reworking an aircraft using a print-on-demand heat blanket system, in accordance with one or more embodiments. The method of FIG. 3 may be characterized as a method of reworking an aircraft including a composite material having an area including an inconsistency. The method shown in FIG. 3 may be implemented using the heat blanket system (100) shown in FIG. 1, and/or the devices shown in FIG. 5. The method of FIG. 3 may be considered a variation of the method shown in FIG. 2. Steps shown in dashed lines in FIG. 3 may be optional in some embodiments.

As described with respect to FIG. 3, a "manufacturing system" is recited as performing the various steps. The "manufacturing system" refers to the computer, printer, and other hardware used to manufacture the heat blanket system. Thus, the "manufacturing system" may include the computer (500) of FIG. 1 and the three dimensional printer (506) of FIG. 5. In each step, the appropriate feature of the manufacturing system performs the specified act. Thus, for example, while the description of FIG. 3 refers to the "manufacturing system" performing the step of receiving a digitized model, the actual step of receiving may be performed by the computer (500). In another example, "manufacturing system" performing the step of printing may refer to an action performed the three dimensional printer (506) shown in FIG. 5.

At step 300, the manufacturing system prepares the aircraft for rework by preparing the composite material in the area of the inconsistency. Preparing the aircraft for rework may be performed by a robot or a technician. The aircraft may be prepared by scarfing or sanding the composite material in the rework area, scoring the rework area, or completely removing a portion of the composite material in the rework area. Preparing the aircraft may also include creating or procuring a composite patch to be placed in or on the rework area, and/or placing a liquid resin or pre-preg tape on the rework area.

At step 302, the manufacturing system generates a digitized model of the area of the inconsistency. The digitized model includes a heating model that specifies sub-areas of the area of the inconsistency for which corresponding different amounts of heating are applied to an uncured composite material that is applied to the inconsistency. An example of a heating model is shown in FIG. 13.

At step 304, the manufacturing system generates, from the digitized model, a design for heating elements of varying density across the sub-areas. The design is configured to cause the heating elements to generate a first amount of heat in a first sub-area in the sub-areas. The design is further configured to cause the heating elements to generate a second amount of heat in a second sub-area in the sub-areas. The first amount of heat is different than the second amount of heat. A description of an example of generating a design for heating elements from the digitized model is described with respect to FIG. 8 through FIG. 13.

At step 306, the manufacturing system prints, according to the design using a three dimensional printer, the heating elements on a blanket to manufacture a heat blanket system. The term "blanket" (by itself) and "heat blanket system" are differentiated in that the "heat blanket system" is the "blanket," after the heating elements designed according to the one or more embodiments have been printed upon the blanket, along with any other components attached on or in the blanket.

Figure 5:
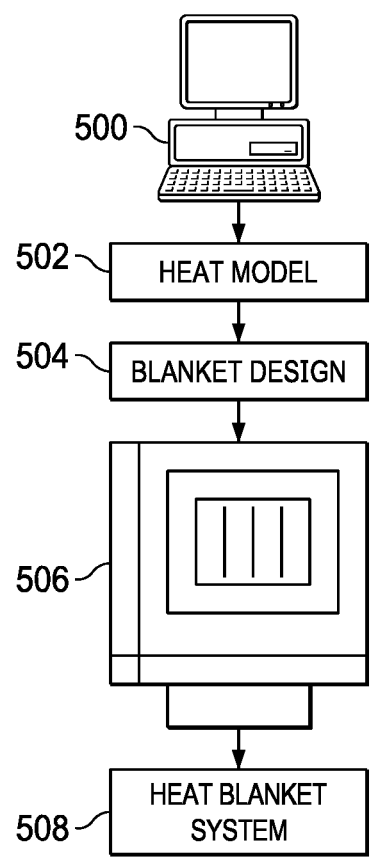
FIG. 5 illustrates a system for generating a print-on-demand heat blanket system, in accordance with one or more embodiments.

Optionally, at step 308, the manufacturing system may print a first thermal sensor and a second thermal sensor on the heat blanket system as part of manufacturing the heat blanket system. The first thermal sensor is printed on the heat blanket system to measure a first temperature in the first sub-area of the rework area. The second thermal sensor is printed on the heat blanket system to measure a second temperature in the second sub-area of the rework area. Printing may be accomplished using a three dimensional printer, as shown in FIG. 5.

At step 310, the manufacturing system applies an uncured composite patch to the area of the inconsistency. Applying may be performed by a robot or a human technician. The patch is an uncured composite material. The patch may be replaced, in some embodiments, with a liquid composite resin or pre-preg tape. The one or more embodiments contemplate liquid composite resin or pre-preg tape as being considered equivalent to a "patch" for purposes of the one or more embodiments.

At step 312, the manufacturing system applies the heat blanket system to the uncured composite patch. Application of the heat blanket system may be accomplished using a robot, or by manual application by a human technician.

At step 314, the manufacturing system cures the uncured composite patch by applying differential heating to the uncured composite patch using the heat blanket system. Differential heating may be accomplished by applying a uniform electrical current to different sub-sets of resistive heating elements of varying density. Differential heating may also be accomplished by applying different current levels to different sub-sets of resistive heating elements printed on the heat blanket system.

Optionally, at step 316, the manufacturing system may monitor, by the thermal sensors printed on the heat blanket system, corresponding temperatures in the sub-areas of the rework area. For example, the system may measure, during curing, the first temperature with the first thermal sensor. The system may also measure, during curing, the second temperature with the second thermal sensor. The system may then determine a difference between the first temperature and the second temperature, and monitor the difference over time.

At step 318, the manufacturing system may determine whether the difference exceeds a temperature difference threshold. If the temperature difference exceeds the threshold (a "yes" determination at step 318), then at step 320, the system may generate an alert. If the alert is generated then, optionally, a robot or a technician may take action to moderate the difference between the first temperature and the second temperature. The action may be to temporarily suspend heating of some or all of the rework area, to add insulation or remove insulation from some or all of the rework area (either above or below the heat blanket system), to modulate an amount of electrical power being delivered to the heat blanket system, to modulate the flow rate of a heated liquid being sent through heating element pipes, or a variety of other possible actions.

Returning to FIG. 3, whether or not the alert is generated at step 320 (e.g., a "no" determination at step 318 or after generation of the alert at step 320), then at step 322 a determination is made whether the composite patch has cured. If the composite patch has not completed curing (a "no" determination at step 322), then the method returns to step 316 and repeats. Otherwise (a "yes" determination at step 322) the method of FIG. 3 terminates.

While the various steps in the flowcharts shown in FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively.

The following example shown in FIG. 4 through FIG. 7 is for explanatory purposes only and not intended to limit the scope of the invention. FIG. 4 through FIG. 7 should be considered together.

Figure 4:
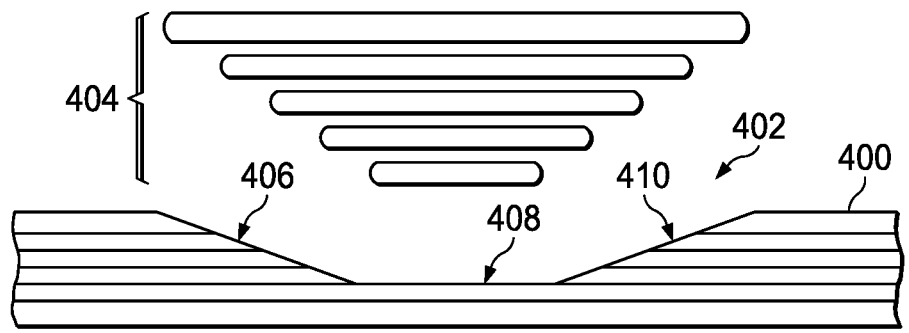
FIG. 4 illustrates a section of a composite material object, including a rework area, in accordance with one or more embodiments.

FIG. 4 illustrates a section of a composite material object, including a rework area, in accordance with one or more embodiments. As shown in FIG. 4, a composite part (400) is being reworked. The composite part (400) includes a rework area (402) in which there existed an inconsistency. Because a portion of the rework area (402) has been removed from the composite part (400), the inconsistency is not shown in FIG. 4. A composite patch (404) is being applied to the rework area (402) in order to rework the composite part (400), thereby effectively mitigating the previously present inconsistency. In different embodiments the composite patch (404) may take the form of liquid composite resin or pre-preg tape, or other composite materials.

The rework area (402) includes three sub-areas in this example: first sub-area (406), second sub-area (408), and third sub-area (410). Because the sub-areas vary in thickness relative to each other, the composite patch (404) may require different amounts of heating in order to maintain a uniform temperature differential throughout the composite patch (404). The heat blanket system (100) described with respect to FIG. 1, and below with respect to FIG. 5 through FIG. 7 may be used to heat the composite patch (404) at a temperature differential that varies within a pre-determined temperature threshold.

FIG. 5 illustrates a system for generating a print-on-demand heat blanket system, in accordance with one or more embodiments. The system shown in FIG. 5 may be used to manufacture the heat blanket system (100) shown in FIG. 1 using the methods described with respect to FIG. 2 and FIG. 3. Thus, the system shown in FIG. 4 may be used to generate the components used to rework the composite part (400) shown in FIG. 4.

The system shown in FIG. 4 includes a computer (500). The computer (500) may be a laptop computer, desk top computer, tablet computer, mobile phone, or other computing device.

The computer (500) includes software which, when executed by a processor using data describing the rework area and the composite part being reworked, generates a heat model (502). The heat model (502) describes the differential heating predicted in different sub-areas of the composite part in order to maintain a temperature differential, throughout the composite patch, within the acceptable threshold. Thus, for example, referring to FIG. 4, the heat model (502) may describe a first temperature to be applied to the first sub-area (406), a second temperature to be applied to the second sub-area (408), and a third temperature to be applied to the third sub-area (410) such that the composite patch (404) will maintain a constant temperature (within the acceptable temperature differential threshold) throughout the composite patch (404) during the curing process. An example of the heat model (502) is shown as heat model (1300) in FIG. 13.

The computer (500) also includes software which, when executed by a processor using data describing the rework area, the composite part being reworked, and the heat model (502), generates a blanket design (504). Thus, the blanket design (504) is a data structure containing data that is stored in a non-transitory computer readable storage medium. The blanket design (504) specifies the location, shape, and density of heating elements disposed in various sub-areas of the heat blanket system. Thus, the blanket design (504) may describe, for example, the arrangement of parts of the heat blanket system (100) shown in FIG. 1 or the heat blanket system shown in FIG. 6. An example of a blanket design (504) is described with respect to FIG. 14A and FIG. 14B.

The blanket design (504) may be provided to a three dimensional printer (506). The three dimensional printer (506) may use resistive inks to print electrically resistive heating elements on the heat blanket system (508). The three dimensional printer (506) may also print three dimensional tubes on the heat blanket system (508) in order to create fluid channels through which a heating fluid may be pumped during the curing process. The heating elements may take other forms, as well. Additionally, as indicated above, other types of printers or deposition devices may be used other than a three dimensional printer.

The three dimensional printer (506) may print other aspects of the heat blanket system (508) as well. For example, the three dimensional printer (506) may print or build up the substrate upon which the heating elements are printed. The three dimensional printer (506) may print or build up layers of dielectric or insulative laminate materials on one or both sides of the substrate. The three dimensional printer (506) may also print or apply other devices, such as but not limited to thermal sensors, thermocouples, control circuits, alert devices, power systems, gas sensors, and other types of features, and may also punch perforations in the heat blanket system (508).

Other devices may be used in addition to the three dimensional printer (506). For example, prior to use of the three dimensional printer (506), a machine may be used to cut the substrate from stock. The stock substrate may be fed to the three dimensional printer (506) in order to print the heating elements on the substrate. The substrate with heating elements may then be provided to a lamination machine in order to laminate one or both sides of the substrate. Additional machines may add additional features or devices to the heat blanket system (508), or may strip certain sub-areas of the heat blanket system (508) of previously built up layers. Thus, the one or more embodiments contemplate that more than just the three dimensional printer (506) may be present in the system shown in FIG. 5.

In any case, the system shown in FIG. 5 manufactures the heat blanket system (508). The heat blanket system (508) may then be used to apply heat to a composite patch placed at a rework area, as shown for example in FIG. 6.

Figure 7:
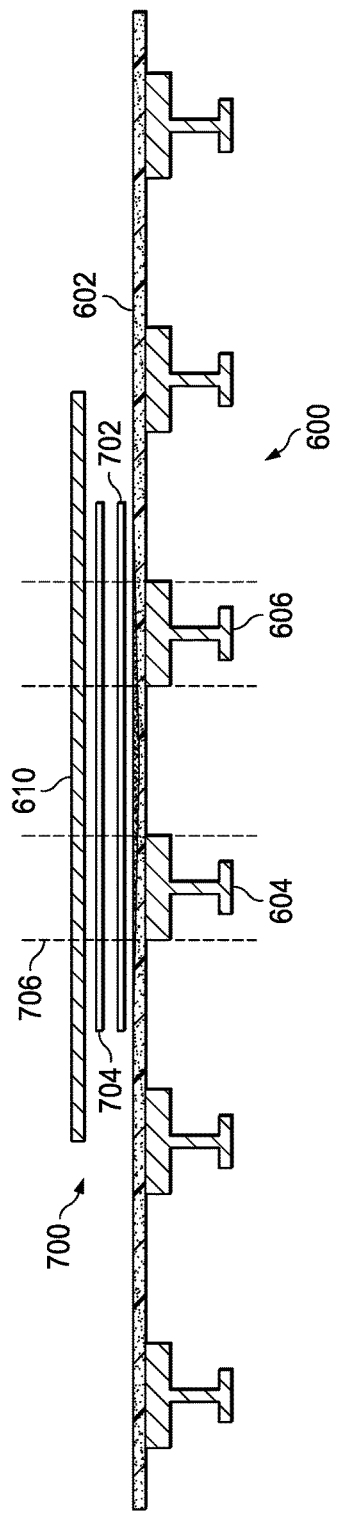
FIG. 7 illustrates application of the specific example of the print-on-demand heat blanket system shown in FIG. 6, in accordance with one or more embodiments.

FIG. 6 illustrates a specific example of a print-on-demand heat blanket system, and a method of use, in accordance with one or more embodiments. FIG. 7 illustrates application of the specific example of the print-on-demand heat blanket system shown in FIG. 6, in accordance with one or more embodiments. FIG. 6 and FIG. 7 should be viewed together as a whole. Thus, FIG. 6 and FIG. 7 share common reference numerals.

The example shown in FIG. 6 and FIG. 7 is a variation of the heat blanket system (100) shown in FIG. 1 and the methods shown in FIG. 2 and FIG. 3. The example shown in FIG. 6 and FIG. 7 may be applied to the composite part (400) shown in FIG. 4 using the heat blanket system (508) manufactured as described with respect to FIG. 5.

In the example shown, a composite structure (600) is a part of an aircraft fuselage or wing. Thus, for example, the composite structure (600) includes a skin (602) formed from a composite material supported by multiple stiffening elements, such as stiffening element (604) and stiffening element (606). The stiffening elements act as heat sinks; i.e., the stiffening elements absorb more heat applied to the skin (602) relative to portions of the skin (602) under which stiffening elements are not present.

An inconsistency (700) is present in the skin (602) of the composite structure (600). Initially, a technician has been tasked with mitigating the inconsistency (700).

Initially, technician prepares the composite structure (600) for rework by defining a rework area (702). The rework area (702) is indicated by the marked line. The technician removes composite material from the skin (602) in the rework area (702) and prepares a pre-preg patch (704) having a shape and dimensions consistent with the rework area (702). The pre-preg patch (704) is a composite material, or layers of composite material, pre-impregnated with a liquid resin. The technician applies the pre-preg patch (704) to the rework area (rework area (702)).

The technician measures that the pre-preg patch (704) is thicker between the first stiffening element (604) and the second stiffening element (606), relative to outer portions of the pre-preg patch (704). The technician also notes that the first stiffening element (604) and the second stiffening element (606) will act as heat sinks during the process of curing the pre-preg patch (704).

Thus, the technician enters data regarding the composite structure (600), the rework area (702), and the pre-preg patch (704) into a heat modeler software on a computer in order to generate a heat model (1300). The heat modeler software may query an existing model-based definition of the structure based on the rework location coordinates and part number. The heat model (1300) takes into account the thermodynamic properties of the skin (602), the first stiffening element (604), the second stiffening element (606), and the pre-preg patch (704). The heat model (1300) also takes into account the effect of differential thickness of the pre-preg patch (704) along the length of the pre-preg patch (704). The heat model (1300) indicates that a first specific amount of heat should be applied to the rework area (702) in the areas of the first stiffening element (604) and the second stiffening element (606), a second specific amount of heat should be applied to the center of the pre-preg patch (704) where the pre-preg patch (704) is thickest, a third specific amount of heat at the edges of the pre-preg patch (704), and a fourth specific amount of heat at other locations of the pre-preg patch (704). The heat model (1300) indicates a heating pattern that, if applied to the pre-preg patch (704), will result in a constant temperature throughout the pre-preg patch (704) during curing, at least within an acceptable temperature threshold.

The heat model (1300) is provided as input to a design software module on the computer in order to generate a print design. The design software module outputs a design for a pattern of resistive heating elements (608) on a heat blanket system (610). The design also includes a series of perforations, such as perforation (612), through which gasses that arise during curing may escape from the pre-preg patch (704).

The print design shows four different sub-areas of the heat blanket system (610) with different densities of the resistive heating elements (608). For example, a first sub-area (614) is disposed around the edges of the heat blanket system (610). The density of the resistive heating elements (608) is higher in the first sub-area (614) relative to the density of the resistive heating elements (608) in a second sub-area (616) just inside the edges where the skin (602) will be present but the first stiffening element (604) and the second stiffening element (606) will not be present. However, the highest density of the resistive heating elements (608) is placed in the third sub-area (618) and the fourth sub-area (620), because these sub-areas correspond to the location where the first stiffening element (604) and the second stiffening element (606) (which act as heat sinks) will be located. The print design also shows a junction (622) to which a power source (624) may be placed.

The technician then provides the print design to a three dimensional printer, such as the three dimensional printer (506) shown in FIG. 5. The three dimensional printer optionally prints the substrate, or the substrate for the heat blanket system (610) may be provided. The three dimensional printer prints the resistive heating elements (608) onto the substrate. The three dimensional printer also may print lamination layers over the resistive heating elements (608). The result is a custom, printed-on-demand heat blanket system available for use for the specific rework project the technician has been tasked to accomplish.

The technician then places the heat blanket system (610) on the rework area (702) over the pre-preg patch (704). As shown by the dotted lines, such as dotted line (706), the different sub-areas of the heat blanket system (610) identified above overlay the specific areas of the rework area (702) that will have different thermodynamic properties. For example, the third sub-area (618) and the fourth sub-area (620) overlay the heat sinks caused by the first stiffening element (604) and the second stiffening element (606), respectively. The first sub-area (614) overlays the edges of the rework area (702). The second sub-area (616) overlays areas that cover the skin (602) away from the edges of the rework area (702) and also away from the first stiffening element (604) and the second stiffening element (606). In other words, the respective densities of the resistive heating elements (608) specifically match the thermodynamic profile (heat model (1300)) of the rework project which the technician has been tasked to perform.

The technician turns on the power source (624), which provides a constant source of electrical current to the resistive heating elements (608). Due to the varying density of the resistive heating elements (608) in the different sub-areas of the heat blanket system (610), the heat blanket system (610) produces differing amounts of heat to different areas of the pre-preg patch (704).

As a result, even though heat sinks and thermodynamic edge effects could have resulted in variable temperatures throughout the length of the pre-preg patch (704), the pre-preg patch (704) is maintained at a constant temperature throughout the length of the pre-preg patch (704), within a specified engineering tolerance.

The cure process may be monitored, such as by monitoring the temperatures of the different sub-areas of the pre-preg patch (704) in the rework area (702). In this case, the temperature remains constant throughout the pre-preg patch (704), within plus or minus ten degrees Fahrenheit, for the four hours used to cure the pre-preg patch (704). When the cure process is complete, the heat blanket system (610) is removed from the rework area (702), the rework process is completed, and the inconsistency (700) has been mitigated.

In summary, the composite structure (600) being reworked has a skin with integral I-beam stiffening elements. The scarf rework on the skin surface passes over the flanges of two I beam stiffeners. The part model for this location on the structure was interrogated and a thermal analysis performed, showing that a higher heat density is to be applied in the rework locations that are common to the stringer flanges. The "skin-only" areas between the stiffeners require a lower heating density. The edges of the heat blanket system require a higher heat density to compensate for the heat losses at the edges of the heat blanket system.

A Thermal Analysis Module (TAM) (the software which produces the heat model (502) in FIG. 5 or the heat model (1300) in FIG. 13) calculates the heat density to be used to achieve a uniform isothermal condition for the part being reworked. The heat density data is exported to a Blanket Design Module (BDM) (the software which produces the blanket design (504) in FIG. 5 or the heat density map (1400) and corresponding blanket design described with respect to FIG. 14). The BDM determines the watt density to achieve a uniform temperature during the curing process.

The desired watt densities are achieved by varying the spacing of the resistive heating wires. Areas of the structure requiring higher heat densities have the heating elements placed more closely together. Areas requiring less heat have the heating elements spaced further apart. The spacing of these heating elements are defined by the BDM.

The circuitry is printed or deposited onto a thin flexible film such as paper, KAPTON®, or fiberglass. The circuit array is then passed through a laminator to encapsulate and insulate the electrical traces. The circuit traces are terminated with a standard power input cable.

The heat blanket system is connected to a controller and used to cure a composite material. The heat blanket system has the heat output density matched exactly to the heat density requirements of the composite structure (600) being reworked. In short, the heat blanket system (610) is custom designed for the specific application thermal uniformity of the curing, but is manufactured on-site and thus may be considered a "print-on-demand" heat blanket system.

FIG. 8 through FIG. 14B should be considered together. FIG. 8 through FIG. 14B show a specific example of producing a design for heating elements that are to be printed on a heat blanket system, with the design produced using a heating model. Thus, FIG. 8 through FIG. 14B show a specific example of how a custom heat blanket system may be designed and produced from a heating model, with the heat blanket system for use on a specific rework project to be performed on a particular aircraft panel. Thus, FIG. 8 through FIG. 14B may share common reference numerals which refer to common objects having common descriptions.

The example shown in FIG. 8 through FIG. 14B does not necessarily limit the other examples described herein, or the claimed inventions, as other examples are possible. Any numerical values, shapes, designs, etc. may be varied according to various different projects or embodiments.

Figure 8:
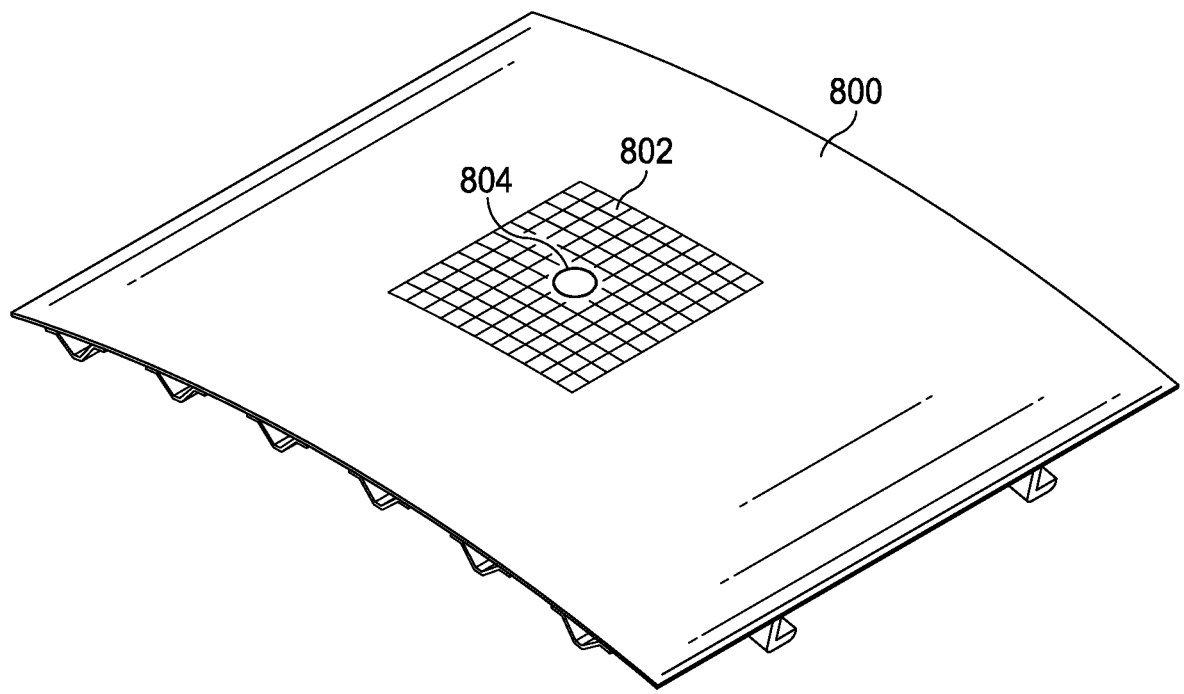
FIG. 8 illustrates an aircraft panel having with a rework area including an inconsistency, in accordance with one or more embodiments.
Figure 9:
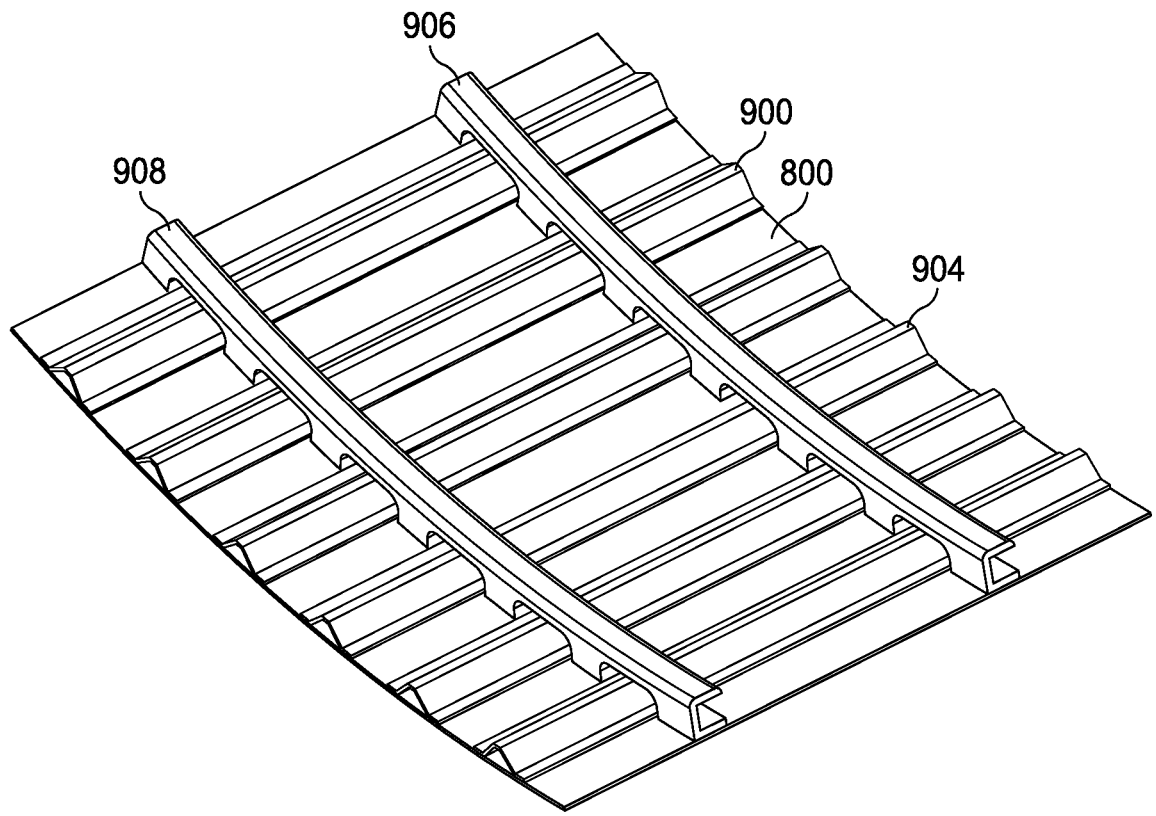
FIG. 9 illustrates an alternative view of the aircraft panel of FIG. 8, in accordance with one or more embodiments.
Figure 10:
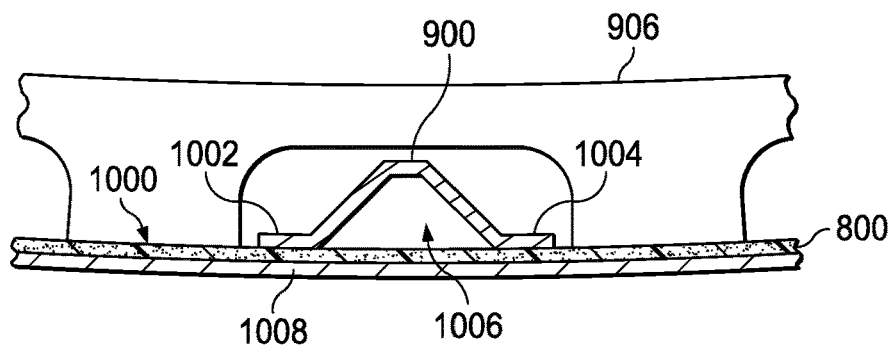
FIG. 10 illustrates a cross-section of the aircraft panel of FIG. 8, in accordance with one or more embodiments.

Attention is first turned to FIG. 8 through FIG. 10. FIG. 8 illustrates an aircraft panel (800) having with a rework area (802) including an inconsistency (804), in accordance with one or more embodiments. FIG. 8 may be characterized as an outer mold line of the aircraft panel (800). The aircraft panel (800) is formed of a composite material. The inconsistency (804) is to be reworked using a process which involves curing a composite patch, composite liquid or gel, a pre-preg patch, or other composite material for which heat is applied to cure the rework area.

FIG. 9 illustrates an alternative view of the aircraft panel (800) of FIG. 8, in accordance with one or more embodiments. In particular, FIG. 9 shows an opposing side of the aircraft panel (800) shown in FIG. 8, and thus may be characterized as an inner mold line of the aircraft panel (800).

The inner mold line shows a number of stiffeners that run a length of the aircraft panel (800), such as stiffener (900) and stiffener (904). The stiffeners are hollow in this example, but need not be hollow. The stiffeners in this particular example may be characterized as "hat shaped" stiffeners or characterized as "omega stiffeners." The stiffeners can have different shapes in different embodiments.

The inner mold line also shows a number of frame elements, including frame element (906) and frame element (908). Each frame element may be a solid material, including aluminum, composite materials, etc., useful for stiffening the aircraft panel (800) in a hoop direction of the aircraft panel (800). However, the frame elements may also be hollow, and have a variety of different shapes, and may be composed of a variety of different materials.

FIG. 10 illustrates a cross-section of the aircraft panel (800) of FIG. 8, in accordance with one or more embodiments. The aircraft panel (800) is shown as a skin. A frame element, in this case the frame element (906), is shown connected to the aircraft panel (800) at a skin-to-frame interface (1000). The stiffener (900), also connected to the aircraft panel (800) along two flanges, including flange (1002) and flange (1004) of the stiffener (900), is shown passing underneath the frame element (906). The stiffener (900) may be, or may not be, connected to the frame element (906). A cavity (1006) is disposed inside the stiffener (900), and may run the length of the stiffener (900).

A heat blanket system (1008) is shown for reference. The heat blanket system (1008) is the custom heat blanket system designed as described with respect to FIG. 14A and FIG. 14B.

Figure 11:
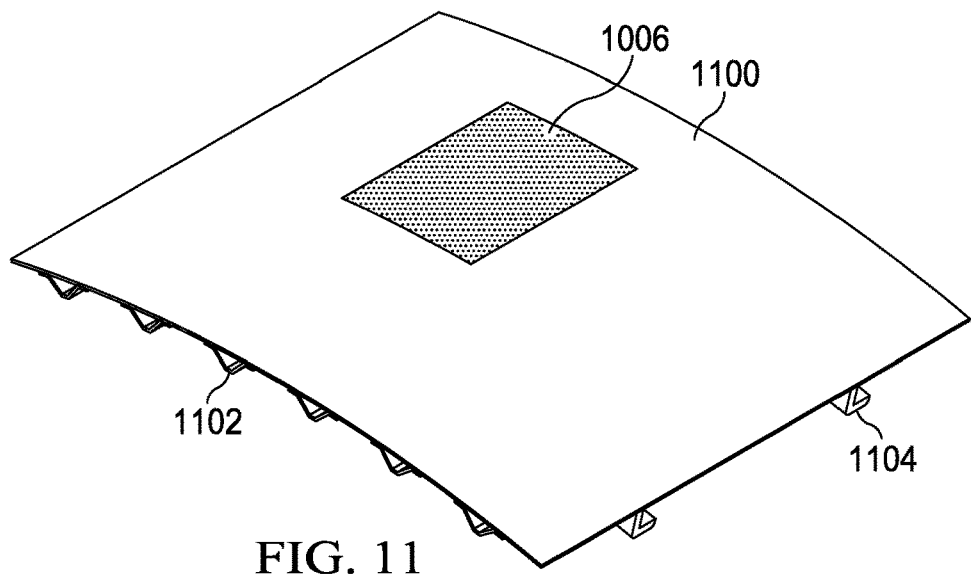
FIG. 11 illustrates a part of a heating simulation as part of a process for producing a heating model for the panel shown in FIG. 8, in accordance with one or more embodiments.
Figure 12:
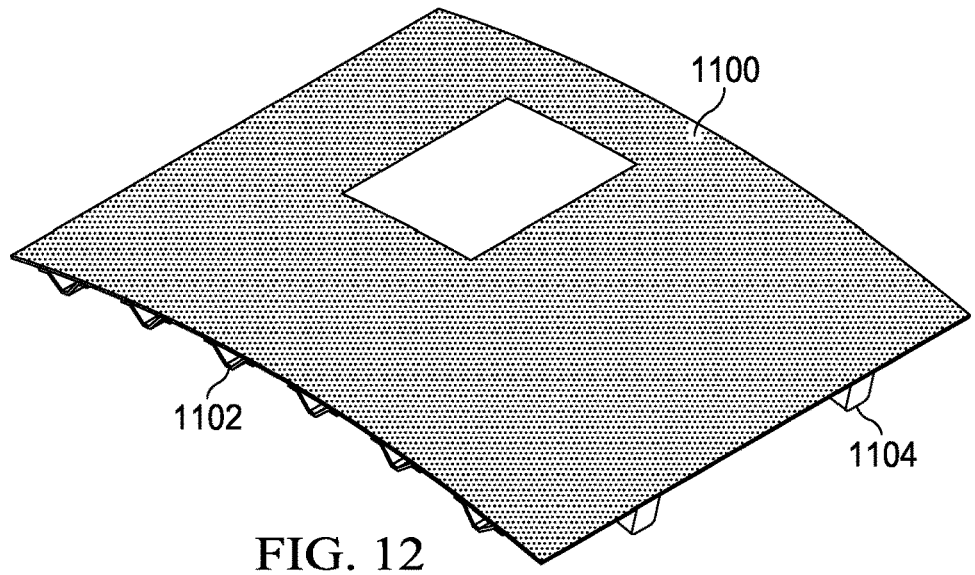
FIG. 12 illustrates another part of the heating simulation in FIG. 11 as part of a process for producing a heating model for the panel shown in FIG. 8, in accordance with one or more embodiments.

FIG. 11 illustrates a part of a heating simulation as part of a process for producing a heating model for the panel shown in FIG. 8, in accordance with one or more embodiments. FIG. 12 illustrates another part of the heating simulation in FIG. 11 as part of a process for producing a heating model for the panel shown in FIG. 8, in accordance with one or more embodiments.

Thermal analysis was conducted on a simulated panel (1100), which corresponds to the aircraft panel (800) shown in FIG. 8 through FIG. 10. The simulated panel (1100) also has simulated stiffeners, such as simulated stiffener (1102), which correspond to the stiffeners shown in FIG. 8 through FIG. 10. The model also included simulated frame elements, such as simulated frame element (1104), corresponding to the frame elements shown in FIG. 8 through FIG. 10.

The gauge, or thickness, of the aircraft panel (800) is constant. However, the thermal load varies by a large degree for the following reasons. The closed hat stringer cavity (1006) creates an insulating air gap inside the stringer cavity (1006) that prevents convective heat loss. This area will trap heat and create a localized hot spot on the outer skin common to the stringer cavity (1006). Meanwhile, the hat stringer flanges, such as flange (1002) and flange (1004), that overlay the aircraft panel (800) increase the skin thickness locally, creating a heat sink directly adjacent to the insulating air gap created by the stringer cavity (1006). Further complicating matters are the frame attachments points, characterized by the skin-to-frame interface (1000), between hat stringers. The frame attachment shear ties (i.e., the skin-to-frame interface (1000)) span the gap between each hat stringer at every frame location. Each frame attachment location is a localized heat sink of about two by six inches, in this specific embodiment.

Returning to FIG. 11, a first simulation area (1106) is centered over the stringer cavity (1006) in the longitudinal direction. The first simulation area (1106) corresponds to the rework area (802). The frame element (906) spans the simulation area (1106) near the right edge.

Returning to FIG. 12, a second simulation area (1108) shows convective heat losses that occur when simulated heating is applied to the first simulation area (1106). Together, the first simulation area (1106) and the second simulation area (1108) form a heating simulation.

The heating simulation may factor other conditions. For example, the heating simulation may also factor in the insulating properties of the vacuum bagging materials used in a composite cure process.

During a rework simulation, the first simulation area (1106) was virtually heated using the heat energy equivalent to a five watt per square inch resistive heat blanket system. The duty cycle of the simulated heat source was modulated to achieve a maximum temperature of 360° Fahrenheit anywhere within the bounds of the first simulation area (1106). This level of power was maintained until all the temperature changes within the first simulation area (1106) were about zero.

FIG. 13 illustrates a heating model for the aircraft panel (800) shown in FIG. 8, in accordance with one or more embodiments. FIG. 13 shows the results of the heating simulation performed with respect to FIG. 11 and FIG. 12, and thus FIG. 13 shows an example of a heating model (1300).

The resulting simulation temperatures are depicted in spans of contoured lines within the rework area (1302), with each span indicating a temperature differential of about 20 degrees Fahrenheit. A temperature scale (1304) is shown for reference. Hashing patterns within the spans show different temperature ranges, from the hottest areas (about 360° F.~340° F.) to the coolest areas (about room temperature (70° F.)), as indicated by the hashing patterns shown for which the temperature scale (1304) provides a legend.

Line (1306), running from left to right in FIG. 13, follows the hat stringer cavity (1006). Line (1308), running from top to bottom in FIG. 13, follows the fuselage frame. The central portion of the rework area (1302), common to the stringer cavity (1006), was the hottest region. However, the profound heat sink effect of the skin-to-frame interface (1000) (again, indicated by line (1308)) is clearly visible in area (1310) on the right side of the rework area (1302).

The data from the initial test is used define discrete temperature bands or zones for the rework area (1302). The dimensional coordinates of thermal zones are defined by the thermal analysis module (TAM) on the part model. Iterative thermal simulations can then be performed by the TAM. The simulated heat output (watts per square inch) is independently increased or decreased within in each zone. This loop is repeated until the desired degree of thermal uniformity is achieved within the rework area (1302).

The final output of the TAM is a heat density map for a heat blanket system based on the thermal analysis of the structure's model based definition and the location of the inconsistency on the aircraft panel (800). An example of a heat density map for a heat blanket system is shown in FIG. 14 below.

Figure 14A:
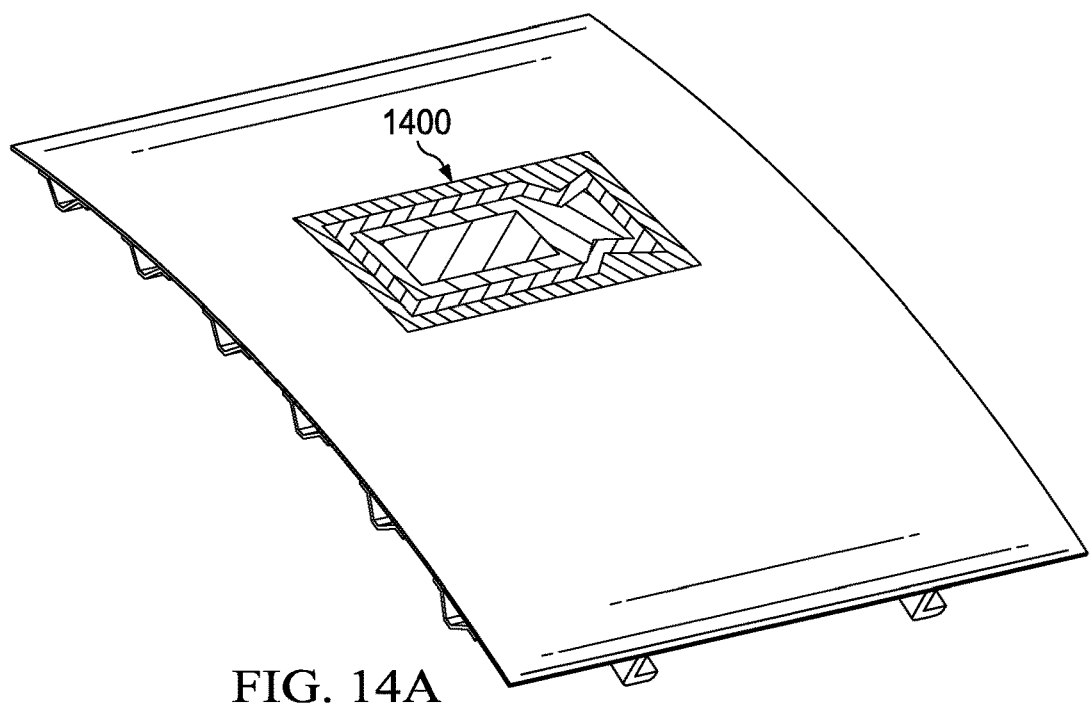
FIG. 14A illustrates a heat density map for a thermal blanket generated from the heating model in FIG. 13, in accordance with one or more embodiments.
Figure 14B:
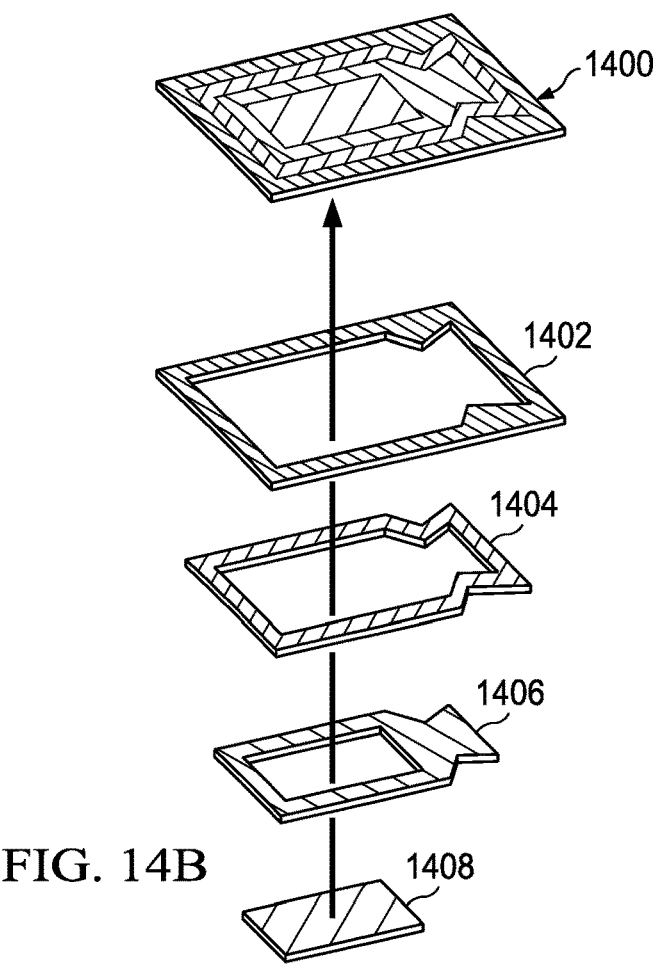
FIG. 14B illustrates a heat density map for a thermal blanket generated from the heating model in FIG. 13, in accordance with one or more embodiments.

FIG. 14A and FIG. 14B illustrate different views of a heat density map for a heat blanket system generated from the heating model in FIG. 13, in accordance with one or more embodiments. The heat density map (1400) for the heat blanket system is a guide for determining the density of heating elements to be placed in each corresponding area of the heat density map (1400). In particular, the spacing of heating elements may be inferred from the particular number of Watts of heating to be applied to a particular area. Thus, FIG. 14A and FIG. 14B effectively show a design, generated using the heating model of FIG. 13, for heating elements to be printed on a heat blanket system that is to be applied to the aircraft panel (800).

The heat density map (1400) includes different zones, such as Zone A (1402), Zone B (1404), Zone C (1406), and Zone D (1408). Each zone is shown by a different hash pattern. Each zone is to receive a pre-defined number of Watts of heat energy. The heat blanket system is to apply 8 Watts of heat energy in Zone A (1402). The heat blanket system is to apply 6 Watts of heat energy in Zone B (1404). The heat blanket system is to apply 4 Watts of heat energy in Zone C (1406). The heat blanket system is to apply 3 Watts of heat energy in Zone D (1408). Taken in combination as a whole, when the above pattern of heat energies are applied by the customized heat blanket system to the rework area (802), the net resulting temperature achieved in the rework area (802) is about uniform (i.e., within a predetermined temperature threshold). Accordingly, the prepreg patch or other composite material used to rework the inconsistency (804) maintains a uniform temperature throughout the cure process, despite fact that differentials in thermal absorptivity exist within the rework area (802).

Note that once the size, shape, and heat densities for each zone are defined, the heating model data can be output to a circuit design module to design the circuit traces for printing of the heat blanket system such that, when powered, the circuit traces will produce the designated number of Watts of heat energy. At this stage, the heat density zones may be edited for improved manufacturing according to user input. If the changes are deemed significant, the resulting producible design can be re-run through the TAM module to ensure the changes do not affect the performance of the heat blanket system to an undesirable degree.

Thus, the one or more embodiments described above provide for a print-on-demand (POD) heat blanket system (printable by direct write circuitry, and inkjet printers, or three dimensional printers). When a part is to be reworked, a model based definition for that part can be queried to know the exact composition of the part at the location of the inconsistency, along with any attached substructure or systems. Knowing the composition of the part, and substructure, a Finite Element Analysis (FEA) can be performed to determine the amount of heat energy to be applied to heat a region of interest (ROI) to uniform temperature. The heating requirements can be modeled like any other property of the ROI, much like stress or strain. Given this heat flow and heat density data, custom heating circuitry can be designed and printed on a heat blanket system in order to uniformly heat a ROI even though the thermal requirements of the part vary greatly across the ROI. For example, if a ROI has a localized area of reinforcement plies, the custom circuitry would have a corresponding area where the resistance wires are spaced very closely together to achieve a higher heat density in that specific area. Meanwhile, other areas with thin skins would have the resistive wires spaced farther apart to avoid overheating in those locations.

The following is a summary of an exemplary process flow for an aircraft.

1) The location and size/depth of the inconsistency is defined in an aircraft coordinate location.

2) The inconsistency definition data is input into Thermal Analysis Module (TAM).

3) The TAM queries the part Model Based Definition (MBD) to determine the part composition in the region of interest.

4) The TAM calculates the amount of heat energy/density to be applied for the areas of the ROI to achieve an isothermal hold for desired rework cure temperature.

5) TAM exports the heat density data to the Blanket Design Module (BDM).

6) The BDM designs the circuitry for the heat blanket system with variable wire spacing to achieve uniform heating of the ROI based on the specific part MBD.

7) The BDM determines the optimal locations for temperature sensors and incorporates those into the design.

8) The BDM outputs a sensor design to a printer.

9) The printer prints circuits and sensors onto a thermally resistant/flexible print medium to form the heat blanket system.

10) Electrical terminations are made on the heat blanket system.

11) Circuits are run through a laminator to encapsulate and insulate circuitry for use.

12) Power and sensor cables are added to the heat blanket system.

13) The heat blanket system is placed on ROI per location instructions.

14) The cure process is executed.

15) The heat blanket system is disposed of, recycled, or stored.

Figure 15:
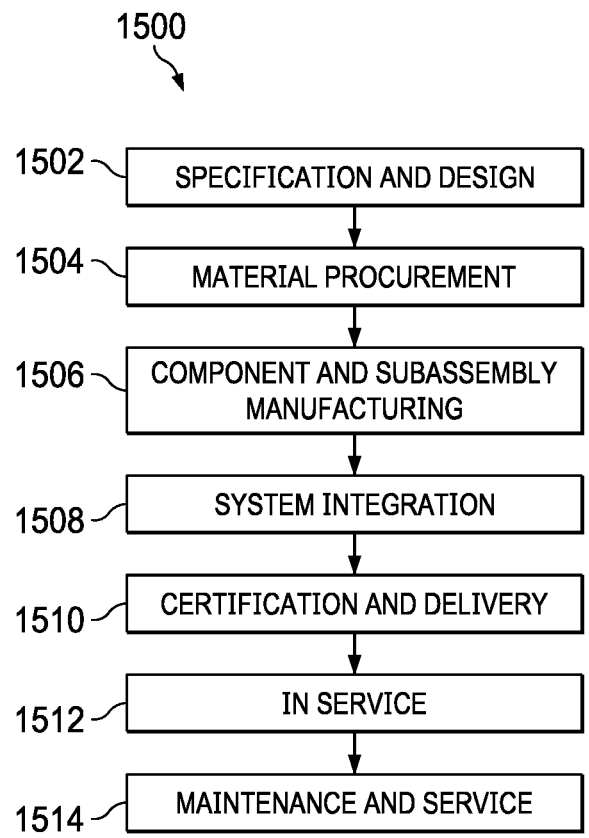
FIG. 15 illustrates an aircraft manufacturing and service method, in accordance with one or more embodiments.
Figure 16:
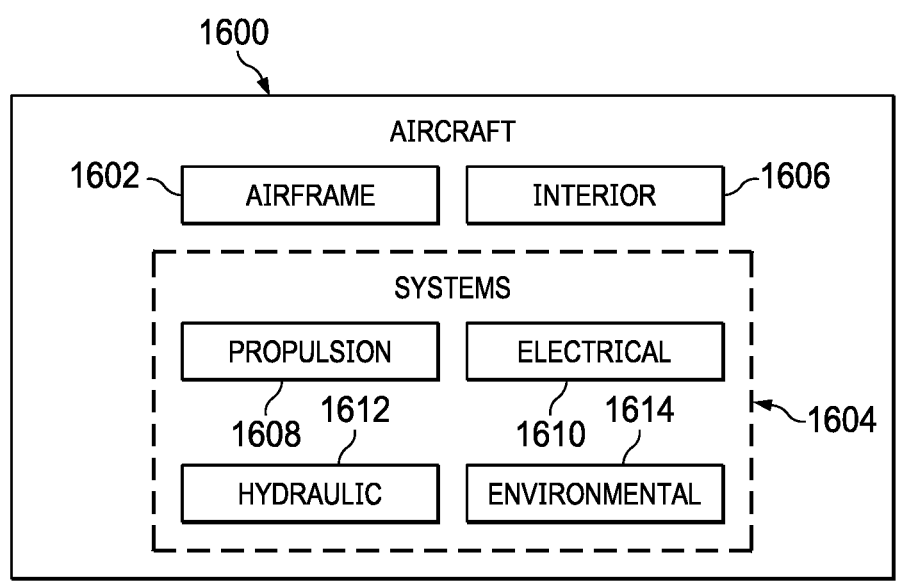
FIG. 16 illustrates an aircraft, in accordance with one or more embodiments.

FIG. 15 illustrates an aircraft manufacturing and service method, in accordance with one or more embodiments. FIG. 16 illustrates an aircraft, in accordance with one or more embodiments. FIG. 15 and FIG. 16 should be considered together. The methods and systems described with respect to FIG. 1 through FIG. 9 may be used in the context of the aircraft manufacturing and service method (1500) shown in FIG. 15. Similarly, the methods and system described with respect to FIG. 1 through FIG. 9 may be used to rework portions of the aircraft (1600) shown with respect to FIG. 16.

Turning to FIG. 15, during pre-production, the exemplary aircraft manufacturing and service method (1500) may include a specification and design (1502) of the aircraft (1600) in FIG. 16 and a material procurement (1504) for the aircraft (1600). During production, the component and subassembly manufacturing (1506) and system integration (1508) of the aircraft (1600) in FIG. 16 takes place. Thereafter, the aircraft (1600) in FIG. 16 may go through certification and delivery (1510) in order to be placed in service (1512). While in service by a customer, the aircraft (1600) in FIG. 16 is scheduled for routine maintenance and service (1514), which may include modification, reconfiguration, refurbishment, and other maintenance or service.

Each of the processes of the aircraft manufacturing and service method (1500) may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 16, an illustration of an aircraft (1600) is depicted in which an advantageous embodiment may be implemented. In this example, the aircraft (1600) is produced by the aircraft manufacturing and service method (1500) in FIG. 15. The aircraft (1600) may include airframe (1602) with systems (1604) and an interior (1606). Examples of systems (1604) include one or more of a propulsion system (1608), an electrical system (1610), a hydraulic system (1612), and an environmental system (1614). Any number of other systems may be included.

Although an aerospace example is shown, different advantageous embodiments may be applied to other industries, such as the automotive industry. Thus, for example, the aircraft (1600) may be replaced by an automobile or other vehicle or object in one or more embodiments.

The apparatus and methods embodied herein may be employed during any one or more of the stages of the aircraft manufacturing and service method (1500) in FIG. 15. For example, components or subassemblies produced in the component and subassembly manufacturing (1506) in FIG. 15 may be fabricated or manufactured in a manner similar to components or subassemblies produced while the aircraft (1600) is in service (1512) in FIG. 15.

Also, one or more apparatus embodiments, method embodiments, or a combination thereof may be utilized during production stages, such as the component and subassembly manufacturing (1506) and system integration (1508) in FIG. 15, for example, by substantially expediting the assembly of or reducing the cost of the aircraft (1600). Similarly, one or more of apparatus embodiments, method embodiments, or a combination thereof may be utilized while the aircraft (1600) is in service (1512) or during maintenance and service (1514) in FIG. 15.

For example, one or more of the advantageous embodiments may be applied during component and subassembly manufacturing (1506) to rework insistencies that may be found in composite structures. As yet another example, one or more advantageous embodiments may be implemented during maintenance and service (1514) to remove or mitigate inconsistencies that may be identified. Thus, the one or more embodiments described with respect to FIG. 1 through FIG. 9 may be implemented during component and subassembly manufacturing (1506) and/or during maintenance and service (1514) to remove or mitigate inconsistencies that may be identified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A heat blanket system comprising:
   a blanket comprising a first sub-area and a second sub-area; and
   a plurality of heating elements printed on the blanket, wherein:
   first spacings between first ones of the plurality heating elements in the first sub-area varies relative to second spacings between second ones of the plurality of heating elements in the second sub-area,
   the first spacings and the second spacings vary according to a design,
   the design is configured for use on a uniquely defined rework area on a uniquely defined composite material object comprising a third area comprising a heat sink region and a fourth area comprising a non-heat sink region,
   the first sub-area is sized and dimensioned to be placed over the third area, and
   the second sub-area is sized and dimensioned to be placed over the fourth area.

2. The heat blanket system of claim 1, wherein the first spacings are less than the second spacings.

3. The heat blanket system of claim 1, further comprising:
a power source connected to the plurality of heating elements.

4. The heat blanket system of claim 3, wherein
the plurality of heating elements comprise resistive heating elements,
the power source comprises a single source of electricity, and
the power source is configured to apply an about constant current to the plurality of heating elements.

5. The heat blanket system of claim 1, wherein the blanket further comprises a plurality of perforations disposed through the blanket.

6. The heat blanket system of claim 1, further comprising:
a thermal sensor printed on the blanket.

7. The heat blanket system of claim 6, further comprising:
a wireless transmitter connected to the thermal sensor; and
a control circuit printed on the blanket, the control circuit configured to modify power delivered to the plurality of heating elements based on signals received by the wireless transmitter.

8. The heat blanket system of claim 1, wherein:
the blanket comprises paper or polyethylene terephthalate (PET), and
the plurality of heating elements comprise conductive or resistive inks.

9. The heat blanket system of claim 8, wherein the blanket further comprises:
a first dielectric layer disposed on a first side of the paper or PET, and
a second dielectric layer disposed on a second side of the paper or PET, opposite the first side.

10. The heat blanket system of claim 1, further comprising:
a first thermal sensor printed on the blanket in the first sub-area; and
a second thermal sensor printed on the blanket in the second sub-area.

11. The heat blanket system of claim 10, further comprising:
a wireless transmitter connected to the first thermal sensor and the second thermal sensor; and
a control circuit printed on the blanket, the control circuit configured to modify power delivered to the plurality of heating elements based on signals received by the wireless transmitter.

12. The heat blanket system of claim 10, further comprising:
a wireless transmitter connected to the first thermal sensor and the second thermal sensor;
an alert device connected to the wireless transmitter; and
a control circuit printed on the blanket and in communication with the wireless transmitter and the alert device, the control circuit programmed to cause the alert device to issue an alert when a difference in temperature measured by the first thermal sensor and the second thermal sensor exceeds a threshold.

13. The heat blanket system of claim 10, further comprising:
a wireless transmitter connected to the first thermal sensor and the second thermal sensor;
an alert device connected to the wireless transmitter; and
a control circuit printed on the blanket and in communication with the wireless transmitter and the alert device, the control circuit programmed to:
cause the alert device to issue an alert when a difference in temperature measured by the first thermal sensor and the second thermal sensor exceeds a threshold, and
modify power delivered to the plurality of heating elements based on signals received by the wireless transmitter.

14. The heat blanket system of claim 10, further comprising:
a computer printed on the blanket and programmed to:
monitor a first temperature of the first sub-area,
monitor a second temperature of the second sub-area, and
control a first amount of power delivered from a power source to first heating elements, of the plurality of heating elements, in the first sub-area,
control a second amount of power delivered from the power source to second heating elements, of the plurality of heating elements, in the second sub-area,
wherein the first amount of power is different than the second amount of power.

15. The heat blanket system of claim 1, wherein the blanket comprises a plurality of perforations disposed through a third sub-area of the blanket, and wherein the third sub-are is disposed between the first sub-area and the second sub-area.

16. The heat blanket system of claim 1, wherein the first sub-area is disposed at a perimeter of the blanket, and wherein the second sub-area is disposed inside the first sub-area.

17. The heat blanket system of claim 1, wherein:
the first sub-area is located on the blanket such that the first sub-area covers rework location coordinates of a pre-defined rework area when the blanket is disposed on the pre-defined rework area, and
the second sub-area is located on the blanket such that the second sub-area lies outside the rework location coordinates of the pre-defined rework area when the blanket is disposed on the pre-defined rework area.

18. The heat blanket system of claim 17, wherein:
the rework location coordinates correspond to a stiffening element connected to the pre-defined rework area, and
the first spacings of the plurality heating elements in the first sub-area are less than the second spacings of the plurality of heating elements in the second sub-area.

19. A heat blanket system comprising:
a blanket comprising:
a perimeter area,
a first outside area defined within the perimeter area,
a first middle area defined within the perimeter area to one side of the first outside area,
a central area defined within the perimeter area to one side of the first middle area,
a second middle area defined within the perimeter area to one side of the central area opposite the first middle area, and
a second outside area defined within the perimeter area to one side of the second middle area opposite the central area;
a first set of heating elements printed on the perimeter area, the first set of heating elements having first spacings;
a second set of heating elements printed on the first outside area, the second set of heating elements having second spacings;

a third set of heating elements printed on the first middle area, the third set of heating elements having third spacings;
a fourth set of heating elements printed on the central area, the fourth set of heating elements having fourth spacings;
a fifth set of heating elements printed on the second middle area, the fifth set of heating elements having fifth spacings; and
a sixth set of heating elements printed on the second outside area, the sixth set of heating elements having sixth spacings,
wherein at least two of the first spacings, the second spacings, the second spacings, the third spacings, the fourth spacings, the fifth spacings, and the sixth spacings are different than each other.

20. A heat blanket system comprising:
a blanket;
a first plurality of heating elements printed on a first sub-area of the blanket, wherein the first plurality of heating elements comprises first spacings between the first plurality of heating elements; and
a second plurality of heating elements printed on a second sub-area of the blanket, wherein the second plurality of heating elements comprises second spacings between the second plurality of heating elements,
wherein the first spacings and the second spacings are sized and dimensioned differently according to a heat density map defined for a rework area to which the blanket is applicable.

* * * * *